(12) United States Patent  
Vangilbergen et al.

(10) Patent No.: US 9,776,334 B2
(45) Date of Patent: Oct. 3, 2017

(54) APPARATUS AND METHOD FOR AUTOMATIC PITCH CONVERSION OF PICK AND PLACE HEADS, PICK AND PLACE HEAD AND PICK AND PLACE DEVICE

(71) Applicant: KLA-Tencor Corporation, Milpitas, CA (US)

(72) Inventors: Bert Vangilbergen, Tienen (BE); Erik De Block, Tung Chung (CN); Jimmy Vermeulen, Sint-Agathat-Berchem (BE); KW Cheung, Tsing Yi (CN); KC Leung, Kwai Chung (CN); Bruno Accou, Linter (BE); Carl Truyens, Rotselaar (BE); Karel Van Gils, Blanden (BE)

(73) Assignee: KLA-Tencor Corporation, Milpitas, CA (US)

( * ) Notice: Subject to any disclaimer, the term of this patent is extended or adjusted under 35 U.S.C. 154(b) by 429 days.

(21) Appl. No.: 14/243,632

(22) Filed: Apr. 2, 2014

(65) Prior Publication Data

US 2014/0271084 A1 Sep. 18, 2014

Related U.S. Application Data

(63) Continuation of application No. PCT/US2014/014250, filed on Jan. 31, 2014.
(Continued)

(51) Int. Cl.
*B25J 15/00* (2006.01)

(52) U.S. Cl.
CPC .................. *B25J 15/0061* (2013.01)

(58) Field of Classification Search
CPC ............ B25J 15/0061; Y10T 29/53974; B65G 47/901; B65G 47/902; B65G 47/905;
(Continued)

(56) References Cited

U.S. PATENT DOCUMENTS

| 5,201,239 A | * | 4/1993 | Bundo | ................... B25J 9/0009 74/479.01 |
|---|---|---|---|---|
| 5,290,134 A | | 3/1994 | Baba | |

(Continued)

FOREIGN PATENT DOCUMENTS

| CN | 1427461 A | 7/2003 |
|---|---|---|
| CN | 1173868 C | 11/2004 |

(Continued)

*Primary Examiner* — Michael McCullough
*Assistant Examiner* — Brendan Tighe
(74) *Attorney, Agent, or Firm* — Simpson & Simpson, PLLC

(57) ABSTRACT

An apparatus for automatic pitch conversion for pick and place heads, comprising at least one auto pitch station for adjusting a pitch in a X-coordinate direction and/or adjusting a pitch in a Y-coordinate direction of pickers/grippers of a pick and place heads; a first actuator, operated by a motor gear assembly of the at least one auto pitch station, wherein the first actuator changes the pitch in the X-coordinate direction distance between rows of pickers/grippers of the respective pick and place head; and a second actuator operated by the same motor gear assembly, wherein the second actuator changes the pitch in the Y-coordinate direction between the pickers/grippers within a row of the respective pick and place head. A method for automatic pitch conversion of pick and place heads and a pick and place head and a pick and place device.

12 Claims, 18 Drawing Sheets

Related U.S. Application Data

(60) Provisional application No. 61/782,189, filed on Mar. 14, 2013.

(58) Field of Classification Search
CPC .. B65G 47/907; B65G 47/912; B65G 47/914; B65G 47/917; G01N 35/1069
USPC ........ 269/55, 56, 57, 58, 59, 60, 61, 62, 63, 269/66, 67, 71, 72, 73, 95, 97, 98, 99, 269/101, 102; 414/416.02
See application file for complete search history.

(56) References Cited

U.S. PATENT DOCUMENTS

| | | | |
|---|---|---|---|
| 5,437,207 A * | 8/1995 | Zimmer | B23K 11/318 414/918 |
| 5,524,947 A | 6/1996 | Mojden et al. | |
| 5,564,312 A * | 10/1996 | Brunman | B25J 19/0029 414/918 |
| 6,068,317 A | 5/2000 | Park | |
| 6,352,402 B1 | 3/2002 | Hwang et al. | |
| 6,439,631 B1 | 8/2002 | Kress | |
| 8,496,425 B2 * | 7/2013 | Lin | B25J 15/0052 192/223 |
| 2002/0110440 A1 | 8/2002 | Padovani | |
| 2014/0102240 A1 * | 4/2014 | Inada | B25J 17/0283 74/490.02 |

FOREIGN PATENT DOCUMENTS

| | | |
|---|---|---|
| EP | 2192063 A1 | 6/2010 |
| EP | 2522583 A1 | 11/2012 |
| JP | 56043126 A | 4/1981 |
| KR | 20080013529 A | 2/2008 |
| TW | 200916391 A | 4/2009 |
| WO | 2007/058076 A1 | 5/2007 |

* cited by examiner

Fig. 3

APPARATUS AND METHOD FOR AUTOMATIC PITCH CONVERSION OF PICK AND PLACE HEADS, PICK AND PLACE HEAD AND PICK AND PLACE DEVICE

CROSS-REFERENCE TO RELATED APPLICATIONS

This application is filed under 35 U.S.C. §120 and §365(c) as a continuation of PCT International Patent Application No. PCT/US2014/014250, filed Jan. 31, 2014, which application claims the benefit under 35 U.S.C. §119(e) of U.S. Provisional Patent Application No. 61/782,189, filed Mar. 14, 2013, which applications are incorporated herein by reference.

FIELD OF THE INVENTION

The present invention relates to an apparatus for automatic pitch conversion for pick and place heads.

The present invention also relates to a method for automatic pitch conversion for pick and place heads.

The invention refers as well to a pick and place head and a pick and place device.

BACKGROUND OF THE INVENTION

European Patent No. EP 2 192 063 (Giacobbe) discloses a pick-up head which has a support structure for holding a horizontal guide. Along the guide a plurality of pick-up devices are arranged side-by-side. The pick-up devices are operated to grip and release respective products and are moved along the guide by a moving assembly for varying the pitch between the pick-up devices. The moving assembly has a respective cam and a respective follower element for each pick-up device. The follower elements are coupled to the pick-up devices, respectively, while the cams are held by a drum which extends along an axis parallel to the horizontal guide and is activated by an actuator to rotate about the axis thereof.

U.S. Pat. No. 6,352,402 (Hwang et al.) describes an apparatus for adjusting a pitch of a picker using a single actuator. The apparatus includes a picker base, a plurality of pickers adapted for varying the pitch of the pickers by use of a linear guide device provided at one side of the picker base. The apparatus includes an actuator for driving the plurality of pickers, and a bevel gear unit coupled to the actuator by upper and lower racks for transmitting the driving force to the plurality of pickers.

Korean Patent Application No. KR 20080013529 (Lee et al.) describes an apparatus for inspecting and packing a semiconductor in a tray. The picking elements are arranged in two rows. A pantograph linkage between the picking elements enables an adjustment of the pitch.

A device tier adjusting a space between chips in a semiconductor chip tester, is disclosed in U.S. Pat. No. 6,068,317 (Park). A carrier plate is mounted movable along a horizontal guide rail. A mounting plate is fixed to the carrier plate and an elevating plate is mounted on the mounting plate movable in up and down direction. A cam shaft is rotatably mounted on the elevating plate. The cam shaft has a plurality of earn grooves formed in a radial direction in an outer circumferential surface. A plurality of pick-up members are fitted movable in a horizontal direction by a horizontal linear motion guider, which is inserted in a state atop of each of the pick-up members in one of the cam grooves.

PCT International Patent Application No. WO 2007/058076 (Yasuno) discloses a multiple nozzle unit with variable nozzle pitch. Each cylinder block shifts along a lateral bar, through an inclined grooved cam and a cam follower, by lifting a grooved cam body. The pitch of each nozzle is variably constituted.

U.S. Pat. No. 5,290,134 (Baba) shows a pick and place apparatus for use in an automatic test handler to pick up electronic devices from one type of tray. The electronic devices are placed in a predetermined position on the other tray for testing and sorting. The pick and place apparatus includes a plurality of suction inlets for picking up the electronic devices from the tray with suction power caused by a vacuum. A guide frame is used for slidably mounting the plurality of suction inlets in a horizontal direction. Furthermore, a mechanism is provided for adjusting the spacing of the suction inlets and to compensate for the differences in spacing between one tray and another tray.

U.S. Pat. No. 6,439,631 (Kress) discloses improved variable-pitch pick and place devices which may include one or more improvements such as a mechanical linkage such as pantograph linkage, the linkage itself linked to a plurality of device-gripping mechanisms arranged in a row so as to keep uniform, though variable, spacing between the device-gripping mechanisms, with the number of such mechanisms being increased relative to the number of parts in the linkage for reduced tolerance stack-up and improved positioning accuracy. The horizontal position of the linkage may be fixed at a position not at an end thereof, and desirably within the middle third or at the middle thereof. The linkage may be controlled at three points. These points may include a vertically flexible but horizontally fixed link to a supporting structure at the middle of the pantograph, a link at one end of the pantograph to one side of an endless loop of timing belt, and a link at tire other end of the pantograph to the other side of the endless loop of timing belt. The links to the timing belt at the ends of the pantograph may be made via two end-most device-gripping mechanisms. The position of the timing belt may be controlled by a servomotor with a position encoder, the servomotor controlled by a controller such as a computer. The device-gripping mechanisms may include a vacuum tip grounded and supplied with vacuum by an electrically-conductive vacuum tube.

Electronic components are often transported in Joint Electron Device Engineering Council (JEDEC) trays, which are molded matrix carriers, during the manufacturing process. The components are placed in the cells of the trays, and placing components in cells is usually done by pick and place robots. A pick and place robot typically has several grippers (or pickers) that can pick-up and remove an electronic component from a cell of a tray and also place an electronic component into a cell of a tray. The gripper may be mechanically clamping the electronic component or more commonly using vacuum nozzles.

In order to increase throughput, pick and place robots are often equipped with multiple grippers such that several components can be picked up or placed in parallel. Since components are of different sizes the number of components per tray row and column also differs and by that also the pitch between components. Therefore, the gripper pitch has to be adjustable and the number of grippers has to be adaptable. The grippers are commonly arranged in a row. In some cases, in particular for smaller components, two or more rows may be used in order to allow for further throughput increase. Ideally, the number of rows and the pitch between these rows would be adjustable as well.

SUMMARY OF THE INVENTION

The invention is an apparatus for automatic pitch conversion for pick and place heads, comprising at least one auto pitch station for adjusting a pitch in a X-coordinate direction and/or adjusting a pitch in a Y-coordinate direction of pickers/grippers of a pick and place heads; a first actuator, operated by a motor gear assembly of the at least one auto pitch station, wherein the first actuator changes the pitch in the X-coordinate direction distance between rows of pickers/grippers of the respective pick and place head; and a second actuator operated by the same motor gear assembly of the at least one auto pitch station, wherein the second actuator changes the pitch in the Y-coordinate direction between the pickers/grippers within a row of the respective pick and place head. Additionally, the invention is a method for automatic pitch conversion of pick and place heads and a pick and place head and a pick and place device.

It is an object of the invention to provide an apparatus for automatic pitch conversion for pick and place devices, which is mechanically less complex, increases the overall tool throughput, is able to handle different type of components and decreases the cost.

The object is achieved by an apparatus for automatic pitch conversion for pick and place heads, comprising: at least one auto pitch station for adjusting a pitch in a X-coordinate direction and/or adjusting a pitch in a Y-coordinate direction of pickers/grippers of a pick and place heads; a first actuator, operated by a motor gear assembly of the at least one auto pitch station, wherein the first actuator changes the pitch in the X-coordinate direction distance between rows of pickers/grippers of the respective pick and place head; and a second actuator operated by the motor gear assembly of the at least one auto pitch station, wherein the second actuator changes the pitch in the Y-coordinate direction between the pickers/grippers within a row of the respective pick and place head.

It is a further object of the invention to provide a method for automatic pitch conversion of pick and place heads which is mechanically less complex to handle, is applicable to a variety of pick and place heads and decreases the overall cost.

The above object is achieved by a method for automatic pitch conversion of pick and place heads comprising the steps of: moving a pick and place head to at least one auto pitch station; operating a motorized pusher of the at least one auto pitch station in a X-coordinate direction for changing a position of at least one row in the X-coordinate direction, wherein the at least one row carries a plurality of pickers/grippers within the pick and place head; operating a motorized changeover fork of the at least one auto pitch station in a X-coordinate direction to get into mechanical contact with one picker/gripper of the respective row; and carrying out a relative movement in a Y-coordinate direction between the changeover fork and the pick and place head changing the pitch in Y-coordinate direction between two consecutive pickers/grippers.

It is an additional object of the invention to provide a pick and place head which is mechanically less complex, light weight, allows the setting of a variety of configurations and decreases the overall cost for handling a variety of different electronic components.

The above object is achieved by a pick and place head which comprises: at least two pickers/grippers which are arranged at least one row oriented in a Y-coordinate direction; two guides per row, wherein the pickers/grippers are movable along the guides in the Y-coordinate direction; a ruler per row to which the pickers/grippers are lockable in position; two pair of blocks, between which the two guides are mounted and the blocks are moveable in a X-coordinate direction rails oriented in the X-coordinate direction; elastic elements, for biasing each row towards a frame element of the pick and place head which is oriented in the Y-coordinate direction; and a lock mechanism, for holding the pickers/grippers of the at least one row at a desired position along the rails.

It is an additional object of the present invention to provide a pick and place device which is mechanically less complex, increases the overall tool throughput, is able to handle different type of components and decreases the cost.

The above object is achieved by a pick and place device which comprises: a plurality individual transport lanes; at least one auto pitch station which is mounted stationary on the pick and place device; a motor for operating a transport system to move at least one pick and place head to the at least auto pitch station, wherein the transport system stretches across the plurality of individual transport lanes; and a sensing system, used to calibrate and to verify a position and a pitch of a plurality of pickers/grippers of the at least one pick and place head.

The first actuator of the apparatus is a pusher which can be moved by a motor gear assembly of the at least one auto pitch station. The direction of movement is along the X-coordinate direction. The second actuator is a changeover fork which is moved by the same motor gear assembly of the at least one auto pitch station. The direction of movement is along the X-coordinate direction. According to a further embodiment, the motor gear assembly encompasses a first motor and a second motor. The pusher can be moved by the first motor and the changeover fork can be operated by the second motor.

The changeover fork is constructed to grab a single picker/gripper of a row or change the pitch in the Y-coordinate direction. A third actuator is associated with the at least one auto pitch station for moving the pickers/grippers in a Z-coordinate direction in order to disable individual pickers/grippers. These pickers/grippers do not contact the electronic components to be handled. The third actuator is a shaft changeover mechanism with at least one shaft pusher which is movable in the Z-coordinate direction for pushing the pickers/grippers into the disabled position.

Preferably, a first auto pitch station and a second auto pitch station are arranged opposite to each other. A shaft changeover mechanism is arranged between the first auto pitch station and the second auto pitch station.

According to the inventive method, prior to changing the pitch in the Y-coordinate direction between two consecutive pickers/grippers the at least one row is moved to a maximum position of the X-coordinate direction within the pick and place head. A locking device pivots into a locking relation with the at least one row in order to securely hold the row at the maximum position.

In an additional step a pusher is operated in a Z-coordinate direction in order to bring a selected picker/gripper to an elevated position in which the picker/gripper is disabled. The picker/gripper is held in the elevated position by a shaft lock bracket.

Prior to carrying out the relative movement in the Y-coordinate direction between the changeover fork and the pick and place head, the changeover fork is inserted into a shaft of the respective picker/gripper for unlocking a pivotable locking element. Thereby a friction material is released from the ruler to which the picker/gripper is locked during an operating state.

Preferably, the inventive method is carried out with a first auto pitch station and a second auto pitch station. The first auto pitch station and the second auto pitch station are arranged opposite to each other and the pick and place head is moved between the first auto pitch station and the second auto pitch station. A first row of pickers/grippers and a second row of pickers/grippers of the pick and place head are moved to a maximum X-pitch and a lock device moves between the first row and the second row and blocks and securely holds the first and the second row at the maximum X-pitch.

The motorized changeover fork of the first auto pitch station and the second auto pitch station are moved in the X-coordinate direction to get into mechanical contact with one picker/gripper of the first and the second row. With the relative movement in the Y-coordinate direction between the changeover fork and the pick and place head the pitch in the Y-coordinate direction between two consecutive pickers/grippers is changed.

After finalizing the adjustment of the pitch in the Y-coordinate direction of all pickers/grippers of the first and the second row the locking device is pivoted to an unlocking position. The motorized pusher of the first auto pitch station and the motorized pusher of the second act on the first and second row for adjusting the pitch between the first row and the second row in the X-coordinate direction.

Finally, a first pusher acts on selected pickers/grippers of the first row and a second pusher acts on selected pickers/grippers of the second row. The first pusher and the second pusher bring selected pickers/grippers of the first and the second row in the Z-coordinate direction to an elevated position in which the pickers/grippers are disabled. A shaft lock bracket keeps the disabled pickers/grippers in a locked position.

Each picker/gripper has a frame element and two openings are formed therein, through which the two guides run. The guides are mounted in the pick and place head. A locking mechanism is mounted to a frame element of the pick and place head which is oriented in the X-coordinate direction. The locking mechanism has a lock device which is pivotably mounted in the locking mechanism and holds the at least one row at a maximum position in the X-coordinate direction.

The locking mechanism has a friction material mounted on a pivotable bar element for locking and unlocking, upon operation of an unlock cylinder, the at least one row. According to one embodiment of the invention, the friction material is configured as a rubber. The locking is carried out once at least one row is in a desired position along the X-coordinate direction. Each picker/gripper of the at least one row has a locking mechanism for locking the picker/gripper at the ruler. The locking mechanism comprises a locking spring and a friction material which are in contact with the ruler and a pivotable locking element.

Each picker/gripper has a shaft which is movable in the frame element along a Z-coordinate direction. Each stopper of a locking spring is brought in engagement with a shaft lock bracket for holding the picker/gripper at an elevated position.

According to a preferred embodiment, the pick and place device has a first auto pitch station and a second auto pitch station. The transport system is arranged such that the at least one pick and place head is placeable between the first auto pitch station and the second auto pitch station.

The advantage of the present invention is that the changeover automation is done largely stationary. The pick and place heads do not have moving parts and are therefore more light weight. Due to the reuse of the existing motor the apparatus is more cost efficient (the Y-pitch adjustment is done by fixating a picker/gripper to the handler body/chassis while moving the pick and place head using the standard actuation. The changeover of the pick and place heads is mechanically less complex. Multi row approaches allow for single row configuration where the single row in use is placed in the center of the pick and place head.

The X-pitch and the Y-pitch are freely configurable. Pitch can be non-equidistant between pickers/grippers and rows. This is important for inspection of larger electronic components that require multiple pickers/grippers per electronic component. Pickup gears are not necessary anymore.

An auto pitch station is used to adjust X-pitch and the Y-pitch and to enable/disable grippers (by lifting them up). The auto pitch station is preferably mounted to the pick and place device body/chassis. In multiple head approaches only one auto pitch station is needed which is more cost efficient. A sensing system, which is anyway part of the pick and place device is used to verify the position/pitch of the pickers/grippers. The sensing system encompasses a sensor arrangement, having beam sensors, and a vision system. The sensor arrangement is used to determine the Y-pitch of the pickers/grippers, by moving all pickers/grippers through the beam sensors. These beam sensors can be moved up and down during the changeover, which is the same principle as for pushing the pickers/grippers along the Z-coordinate direction into the locked and disabled position. The vision system is used to check the X-pitch of at least one row along which the pickers/grippers are arranged in the Y-coordinate direction.

The pick and place device to pick up electronic components from a transportation tray (JEDEC-tray) and to move the electronic components to an inspection station and/or to place electronic components in a transportation tray has one or multiple pick and place heads that can move along a Y-coordinate direction. The pick and place heads can be moved independently from each other along the Y-coordinate direction. The movement being done is by one or multiple belts that are driven by motors. A further possibility is that the movement is being done by one or multiple spindle drives that are driven by motors. The pick and place heads have a plurality of electronic component pickers/grippers positioned along multiple horizontal rows such that electronic components placed underneath the pickers/grippers can be picked up and placed in tray cells.

The multiple horizontal rows comprising the pickers/grippers are parallel to Y-coordinate direction of the pick and place heads. The rows can be shifted in a X-coordinate direction. The pitch between the pickers/grippers is continuously (stepless) adjustable in X- and Y-coordinate direction. It is clear for a skilled person that more than two rows of pickers/grippers are also possible. The changeover fork of the first or second changeover station can be used to move multiple rows together in the Y-coordinate direction. In case a three row pick and place head is used the changeover fork of the first auto pitch station can move the outer row and the middle row of pickers/grippers together. Once the middle row is at the correct position the changeover fork retracts a certain distance and the outer row can be moved to another position. The X-pitch of the rows can be corrected from the bottom. According to a further embodiment of the pick and place head with three rows, it is advantageous if the middle row fixed in X-coordinate direction.

The pickers/grippers are mounted on one of the multiple rows. Each picker/gripper is continuously adjustable along a row in the Y-coordinate direction. Each picker/gripper has its own locking mechanism to lock in the Y-coordinate direction. Alternatively, it is possible to have one central locking mechanism for all pickers/grippers of one row.

The pitch between the rows, on which the pickers/grippers are mounted, are continuously adjustable in the X-coordinate direction. Each row has its own locking mechanism.

Each picker/gripper has its own locking mechanism when it is in the upper position in order to disable the picker/gripper. Unlocking/enabling could be done centrally per row which means that all pickers/grippers are unlocked at the same time. Alternatively, an independent unlocking/enabling means per picker/gripper is possible as well.

BRIEF DESCRIPTION OF THE DRAWINGS

The nature and mode of operation of the present invention will now be more fully described in the following detailed description of the invention taken with the accompanying drawing figures, in which

FIG. 3 is a perspective view of a pick and place head with N rows and M columns;

DETAILED DESCRIPTION OF THE INVENTION

Figure 1:
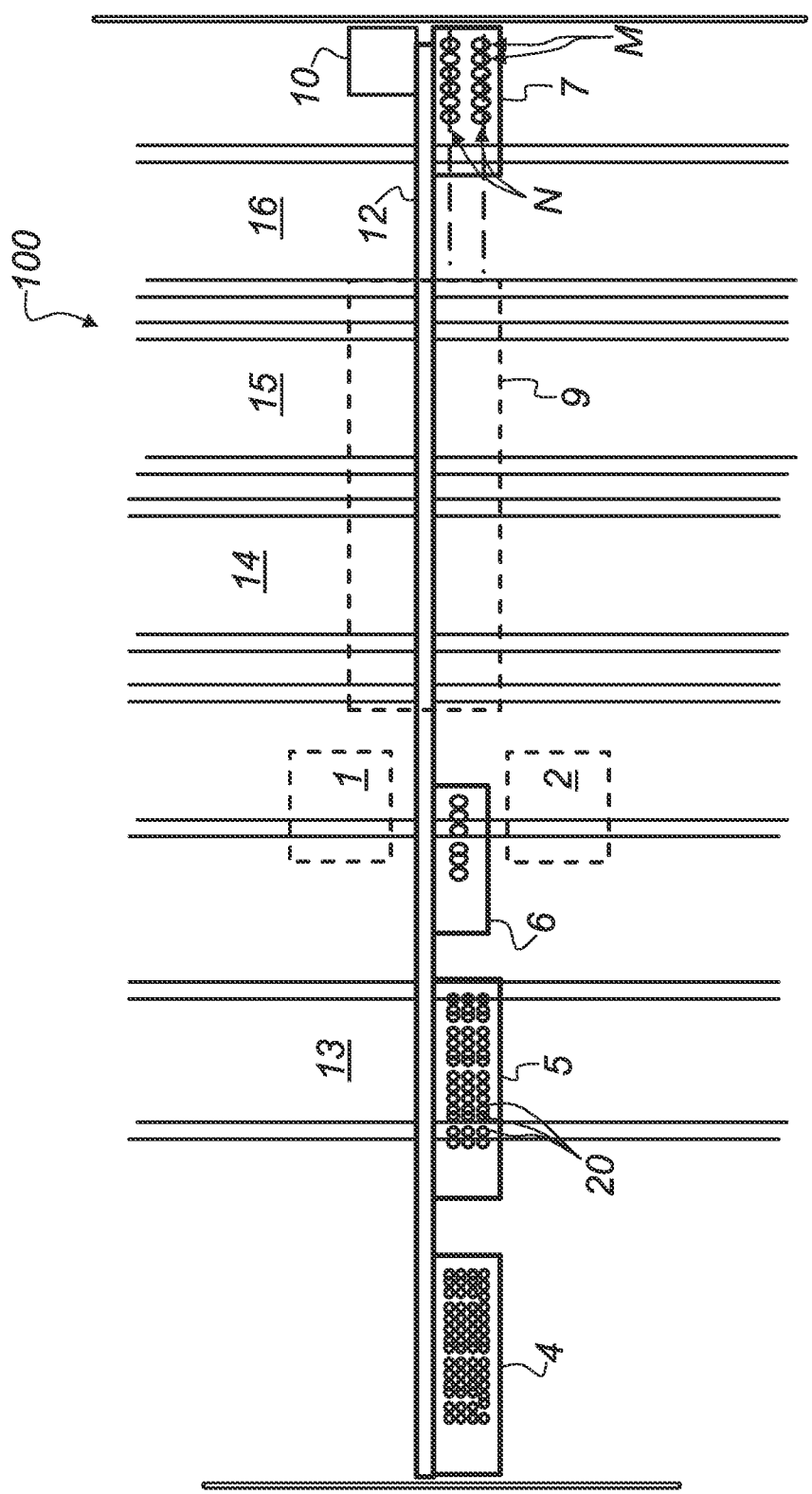
FIG. 1 is a schematic representation of a pick and place device.

Like reference numerals refer to like elements throughout the various figures. Furthermore, only reference numerals necessary for the description of the respective figure are shown in the figures. The shown embodiments represent only examples of how the invention can be carried out. This should not be regarded as limiting the invention.

Furthermore, it is understood that this patent is not limited to the particular methodology, materials and modifications described and as such may, of course, vary. It is also understood that the terminology used herein is for the purpose of describing particular aspects only, and is not intended to limit the scope of the present invention as claimed.

Unless defined otherwise, all technical and scientific terms used herein have the same meaning as commonly understood to one of ordinary skill in the art to which this invention belongs. It should be understood that any methods, devices or materials similar or equivalent to those described herein can be used in the practice or testing of the invention.

The schematic representation of FIG. 1 shows a pick and place device 100. The embodiment shown here has a first and a second auto pitch station 1 and 2. The first auto pitch station 1 and the second auto pitch station 2 are shared between multiple pick and place heads 4, 5, 6, 7. Changeover automation of the pitch of the various pick and place heads 4, 5, 6, 7 is largely carried out stationary and not on moving. Therefore, the pick and place heads 4, 5, 6, 7 are more lightweight since they do not carry motors for adjusting the pitch. The pick and place device 100 has a transport system 12. The transport system 12 stretches across several individual transport lanes 13, 14, 15, 16 which are used to transport JEDEC trays (not shown) or other units through the pick and place device 100. The pick and place device 100 is used to pick up electronic components from a transportation tray (JEDEC tray) and to move the electronic components to an inspection station and/or to place electronic components in a transportation tray. The pick and place heads 4, 5, 6, 7 are used to place electronic components (not shown) in the cells of the JEDEC trays and the placing in the cells of the JEDEC trays is usually done by pick and place devices 100, having several pick and place heads 4, 5, 6, 7. The number of pickers/grippers per pick and place head 4, 5, 6, 7 is only an example and should not be regarded as a limitation of the present invention.

The first and second auto pitch stations 1 and 2 are shared between multiple several pick and place heads 4, 5, 6, 7. The pick and place device 100, shown in FIG. 1, has pick and place heads 4, 5, 6, 7 which differ in the number of rows N and the number of columns M according to which pickers/grippers 20 of the pick and place heads 4, 5, 6, 7 are arranged. The first auto pitch station 1 and the second auto pitch station 2 are stationary in the pick and place device 100. As mentioned before each individual pick and place head 4, 5, 6 or 7 can be moved by the transport system 12 so that the first auto pitch station 1 and/or the second auto pitch station 2 can operate on individual pick and place heads 4, 5, 6 or 7 in order to change the pitch of the pickers/grippers 20 within the rows N and/or columns M. Additionally, a height position H of the pickers/grippers 20 can be changed as well. In an elevated height position H the picker/gripper 20 is not active. Accordingly, with the first auto pitch station 1 and/or the second auto pitch station 2 it is possible to configure the pattern of the pickers/grippers 20 of the pick and place heads 4, 5, 6 or 7 so that it meets the handling requirements for the individual electronic components. The pick and place heads 4, 5, 6 or 7 are pitch free configurable in the direction of the row N and the column M. The pitch can be non-equidistant between pickers/grippers 20. This is important for the inspection and handling of larger electronic components that require multiple pickers/grippers 20 per component.

The pick and place device 100 has a sensing system 9, which is used to verify the position and the pitch of the pickers/grippers 20 of the individual pick and place heads 4, 5, 6, or 7. Calibration is done as well by the sensing system 9.

Figure 2A:
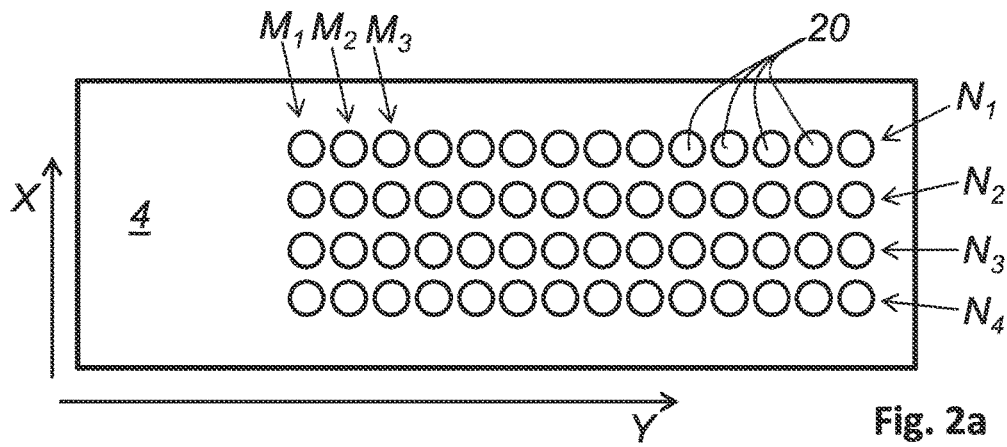
FIG. 2a is a schematic view of an embodiment of a pick and place head.
Figure 2B:
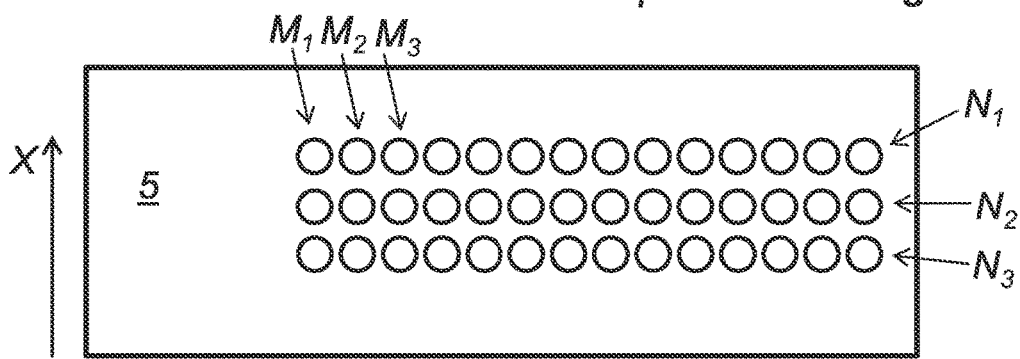
FIG. 2b is a schematic view of an embodiment of a pick and place head.
Figure 2C:
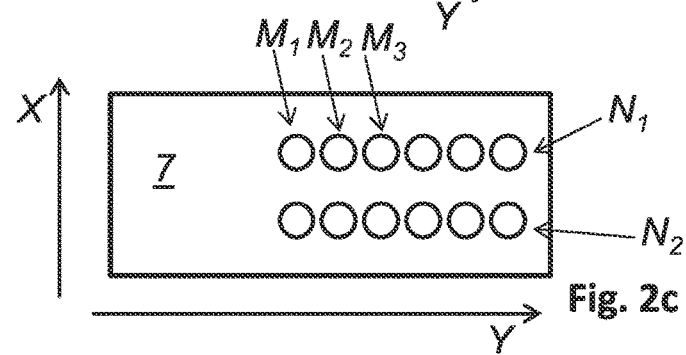
FIG. 2c is a schematic view of an embodiment of a pick and place head.
Figure 2D:
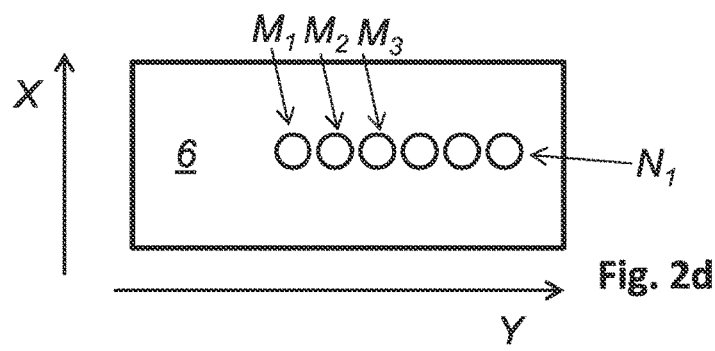
FIG. 2d is a schematic view of an embodiment of a pick and place head.

FIGS. 2a to 2d show various embodiments of the pick and place heads 4, 5, 6 or 7. FIG. 2a is a pick and place head 4 with four rows N of pickers/grippers 20 which are oriented in a Y-coordinate direction Y. The distance between the rows N can be adjusted along a X-coordinate direction X. The embodiment shown in FIG. 2b has three rows N of pickers/grippers 20 oriented in the Y-coordinate direction Y. Both embodiments (FIG. 2a and FIG. 2b) have fourteen columns M of pickers/grippers 20, which are oriented in the X-coordinate direction X. FIG. 2c is an embodiment of a pick and place head 6 with two rows N of pickers/grippers 20 which are oriented in a Y-coordinate direction V. FIG. 2d is an embodiment of a pick and place head 6 with a single row N of pickers/grippers 20 which are oriented in a Y-coordinate direction Y. Both embodiments (FIG. 2c and FIG. 2d) have six columns M of pickers/grippers 20, which are oriented in the X-coordinate direction X. The pick and place heads 4, 5, 6, 7 (shown in FIGS. 2a to 2d) comprising a plurality of electronic component pickers/grippers 20 positioned along multiple horizontal axes (rows N) such that electronic components (not shown) placed underneath the pickers/grippers 20 can be picked up and placed (in tray cells, not shown).

Figure 3:
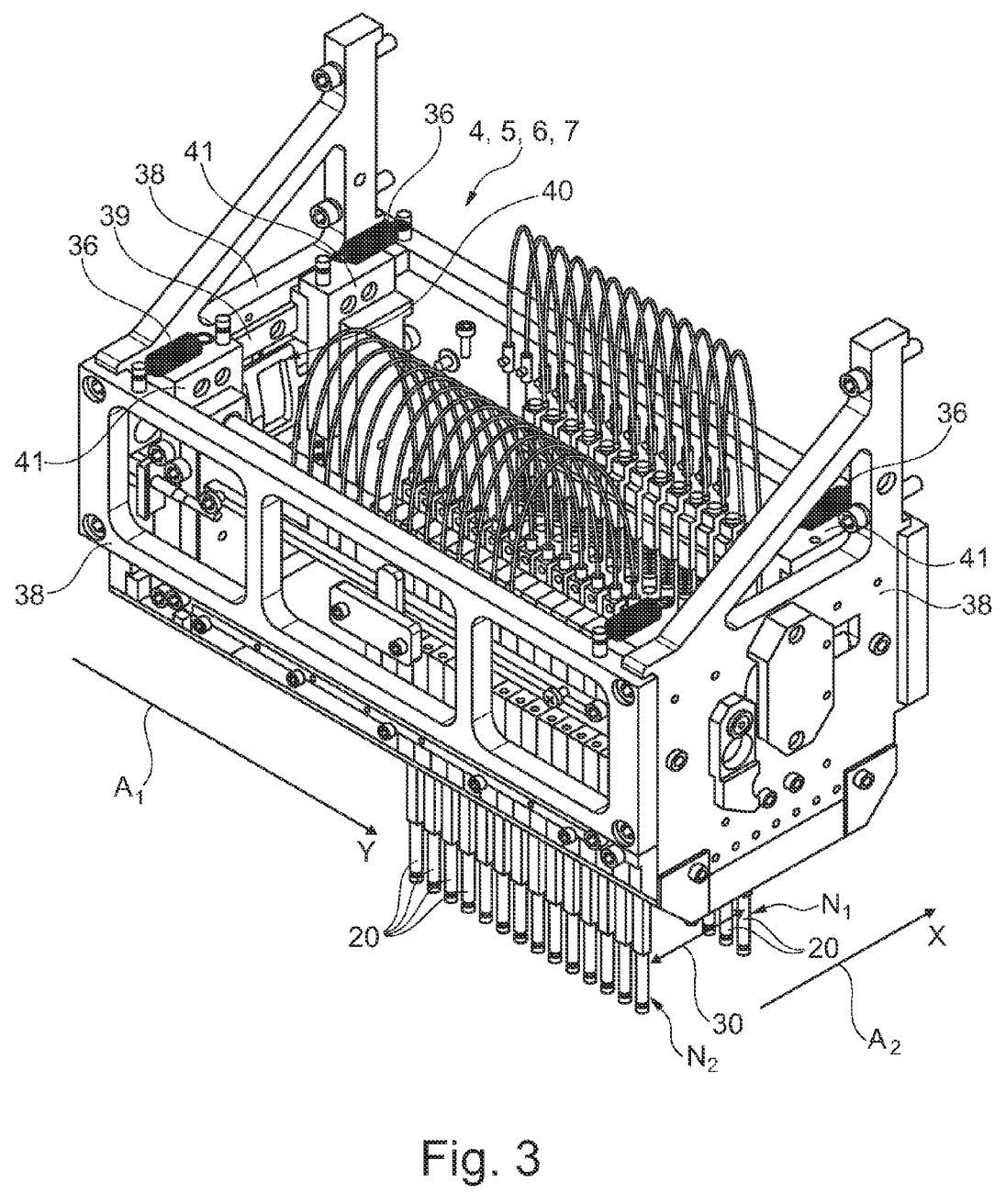

FIG. 3 shows a perspective view of a pick and place head 4, 5, 6, 7 with N rows and M columns of pickers/grippers 20. The embodiment shown here has two rows N (oriented in the Y-coordinate direction Y) with fourteen pickers/grippers 20 and consequently fourteen columns (oriented in the X-coordinate direction X) of pickers/grippers 20. It is noted the number of rows N and the number of columns M should not be regarded as limiting effect of the invention. The pitch 30 (X-pitch) between two successive rows N1 and N2 can be adjusted in the X-coordinate direction X. The pitch 32 (Y pitch) between two successive pickers/grippers 20 within a row N1 or N2 can be adjusted in the Y-coordinate direction Y. The pickers/grippers 20 are moveably mounted within a rigid frame 38. The rigid frame 38 is movably attached to the transport system 12 (see FIG. 1) of the pick and place device 100. The individual pick and place head 4, 5, 6 or 7 can be moved by the transport system 12 to the first auto pitch station 1 and/or the second auto pitch station 2 (see FIG. 4). Each pick and place head 4, 5, 6 or 7 has multiple horizontal axes. The pickers/grippers 20 being parallel to a first horizontal axis $A_1$ which is oriented along the Y-coordinate direction of the pick and place heads 4, 5, 6 or 7. The first horizontal axis $A_1$ can be shifted along a second axis $A_2$, which is oriented in the X-coordinate direction X in order to adjust the pitch 30 (X-pitch) between the first row $N_1$ and the second row $N_2$. Each row $N_1$ and $N_2$ is biased with an elastic element 36 towards a maximum X-pitch 31 (see FIG. 9). The rows $N_1$ and $N_2$ are mounted on blocks 41 which enable the movement of the rows $N_1$ and $N_2$ along the rails 39 in the X-coordinate direction X.

Figure 4:
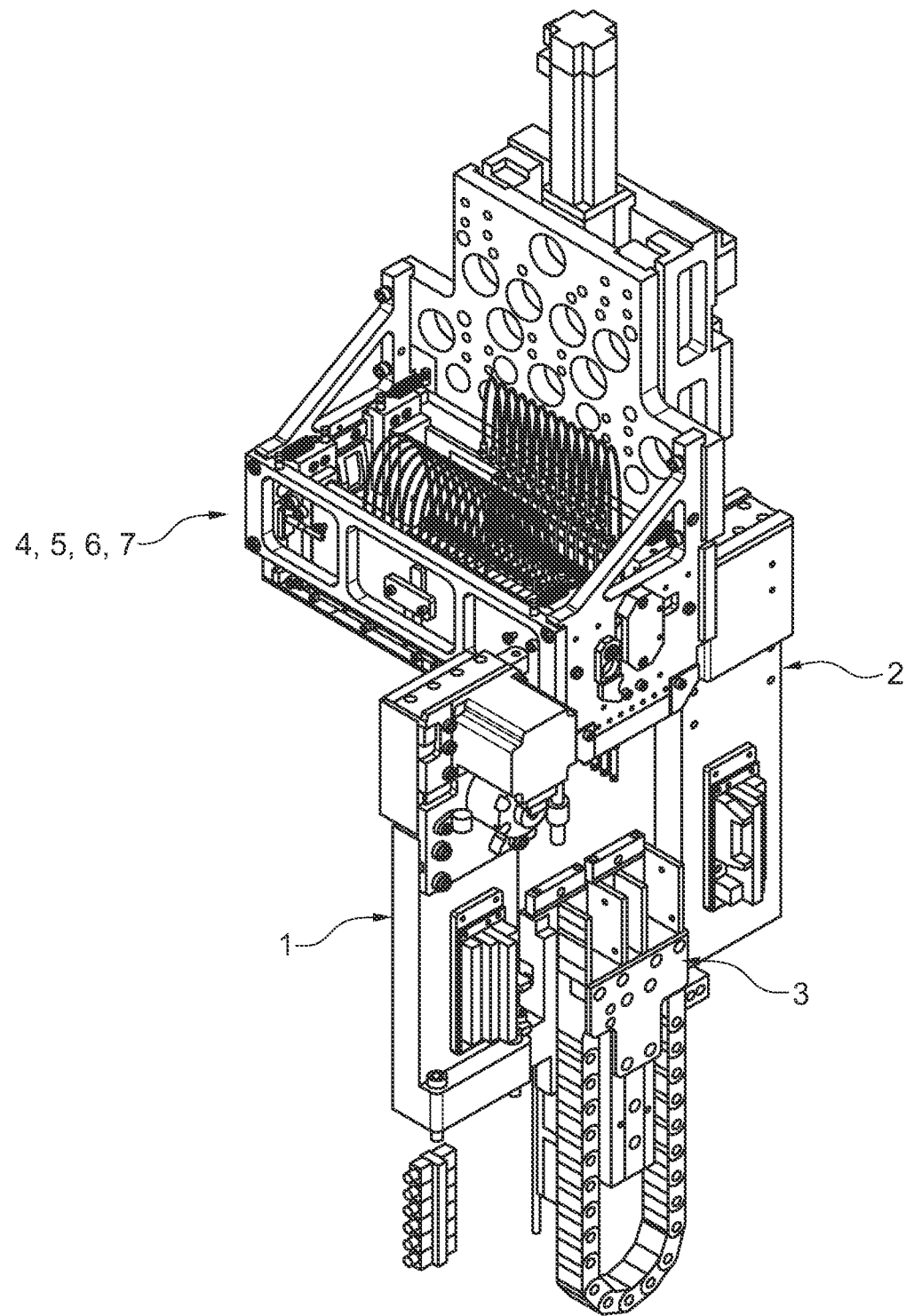
FIG. 4 is a perspective view of the pick and place head of FIG. 3, which is positioned between a first auto pitch station and a second auto pitch station.

In FIG. 4, a perspective view of the pick and place head 4, 5, 6 or 7 of FIG. 3 is shown, which is positioned between the first auto pitch station 1 and the second auto pitch station 2. As shown in FIG. 1, the pick and place heads 4, 5, 6 or 7 can be moved independently from each other by the transport system 12 (see FIG. 1) of the pick and place device 100. The first auto pitch station 1 and the second auto pitch station 2 are preferably fixed to the pick and place device 100. The first auto pitch station 1 and the second auto pitch station 2 are used to configure the pitch of the pickers/grippers 20 of the pick and place heads 4, 5, 6 or 7 in the X-coordinate direction X and Y-coordinate direction Y. Additionally, it is possible to disable/enable pickers/grippers 20 of the pick and place heads 4, 5, 6 or 7. A shaft changeover mechanism 3 is placed between the first auto pitch station 1 and the second auto pitch station 2.

Figure 5:
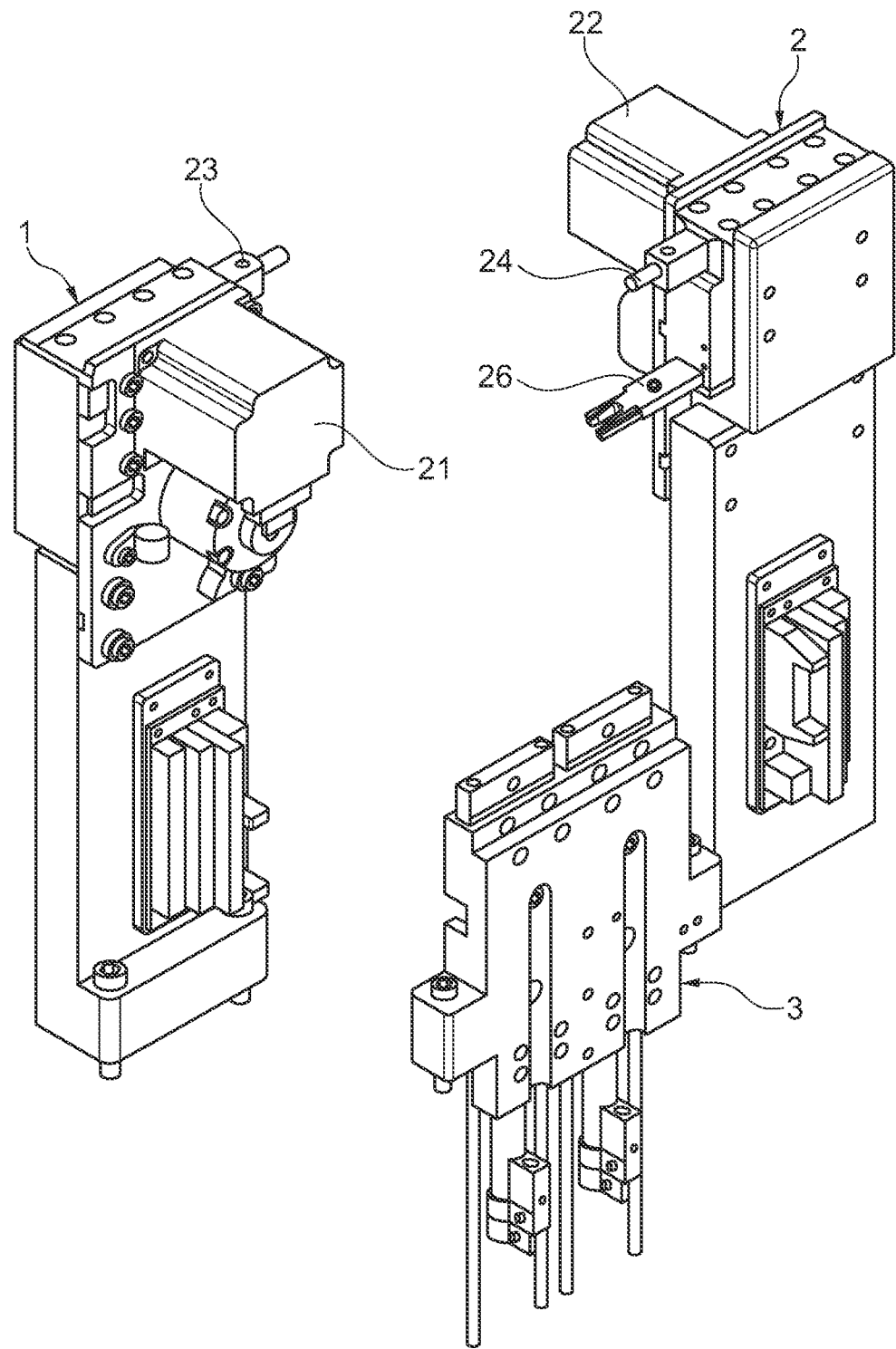
FIG. 5 is a perspective view of the arrangement of the first auto pitch station and the second auto pitch station.

A preferred embodiment is shown in FIG. 5. According to the perspective view, the preferred embodiment comprises a first auto pitch station 1 and a second auto pitch station 2 which are arranged opposite to each other. No pick and place head 4, 5, 6 or 7 is in position between the first auto pitch station 1 or the second auto pitch station 2 in order to provide a better view of the operating elements of the first and second auto pitch station 1 and 2. A shaft changeover mechanism 3 is associated with the first and second auto pitch station 1 and 2. The changeover mechanism 3 is placed such that it can disable/move-up single pickers/grippers 20. The first auto pitch station 1 has a motor gear assembly 21 which is used to operate a pusher 23 to adjust the pitch 30 (X-pitch) between the rows N of the pickers/grippers 20. Additionally, the second auto pitch station 2 has a motor gear assembly 22 for operating a pusher 24 to adjust the pitch 30 (X-pitch) between the rows N in which the pickers/grippers 20 are arranged. The first auto pitch station 1 has a changeover fork 25 (see FIG. 6 of 7) and the second auto pitch station 2 has a changeover fork 26 both of which are used to adjust the pitch 32 (Y-pitch) between the pickers/grippers 20 within a row N or the rows $N_1, N_2, \ldots, N_N$. The changeover fork 25 of the first auto pitch station 1 is operated as well by the gear assembly 21. The changeover fork 26 of the second auto pitch station 2 is operated as well by the motor assembly 22.

Figure 6:
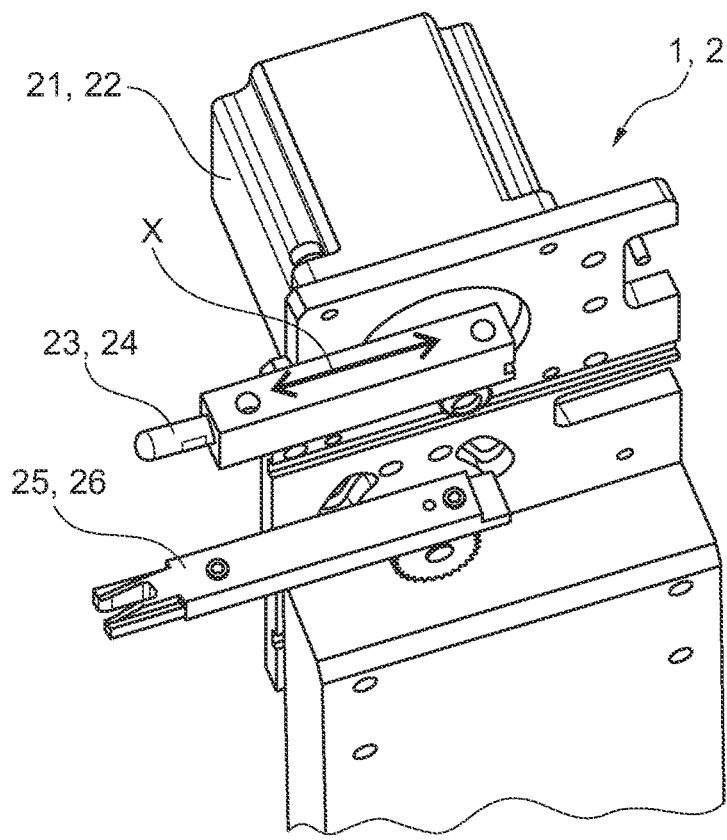
FIG. 6 is a detailed perspective view the second auto pitch station shown in FIG. 5.
Figure 7:
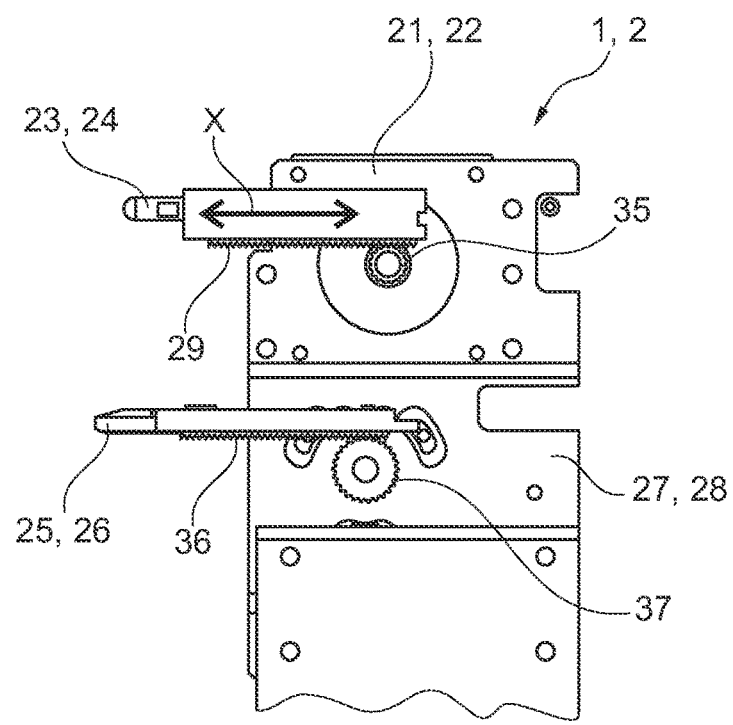
FIG. 7 is a side view of the second auto pitch station shown in FIG. 5.
Figure 8:
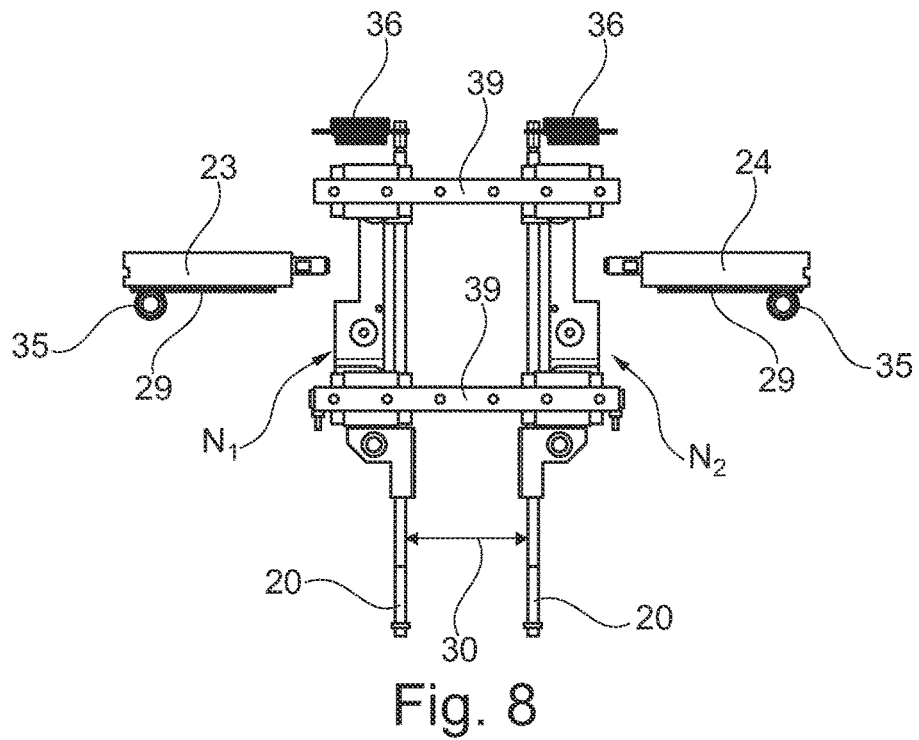
FIG. 8 shows the first actuators of the first and second auto pitch station for changing the distance between rows of pickers/grippers.
Figure 9:
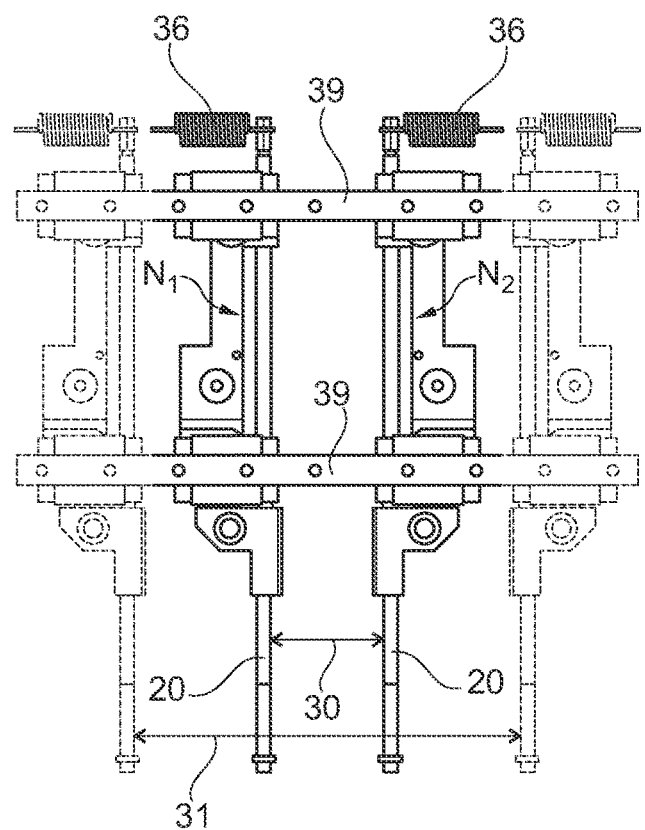
FIG. 9 shows the rows of pickers/grippers at various distances.

FIGS. 6 and 7 show a detailed view of the upper portion of the first or second auto pitch station 1 or 2. The motor gear assembly 21, 22 is used to operate the pusher 23, 24. The pusher 23, 24 is moved by the motor gear assembly 21, 22 along an X-coordinate direction X to adjust the pitch 30 (X-pitch) between the rows N of the pickers/grippers 20 (see FIGS. 8 and 9). The pusher 23, 24 has a gear rack 29 which is in operative relationship with a gear wheel 35 of the motor gear assembly 21, 22. The changeover fork 25, 26 has a gear rack 36 which is in operative relationship with a gear wheel 37 of the motor gear assembly 21, 22. As mentioned above, the changeover fork 25, 26 is used to adjust the pitch 32 (Y-pitch) between the pickers/grippers 20 within a row N. The working principle of the changeover fork 25, 26 is explained in FIGS. 13 to 15, FIG. 8 shows pusher 23 associated with the motor gear assembly 21 of the first auto pitch station 1 and pusher 24 associated with the motor gear assembly 22 of the second auto pitch station 2. FIG. 8 and FIG. 9 show a pick and place head 4, 5, 6 or 7 which has the pickers/grippers 20 arranged in a first row N and a second row $N_2$. Each row $N_1$ and $N_2$ is biased with an elastic element 36 towards a maximum X-pitch 31 (see FIG. 9). The pushers 23 and 24 act against the force of the respective elastic element 36. Preferably, the elastic element 36 is a spring. The pushers 23 and 24 push each row $N_1$ and $N_2$ and the rows $N_1$ and $N_2$ are moved with the pickers/grippers 20 along two parallel rails 39 to the desired pitch 30 (X-pitch). The gear rack 29 of the pusher 23, 24 cooperates with the gear wheel 35 of the respective motors gear assembly 21, 22 in order to bring the first row $N_1$ and a second row $N_2$ to the desired pitch 30 (X-pitch).

Figure 10:
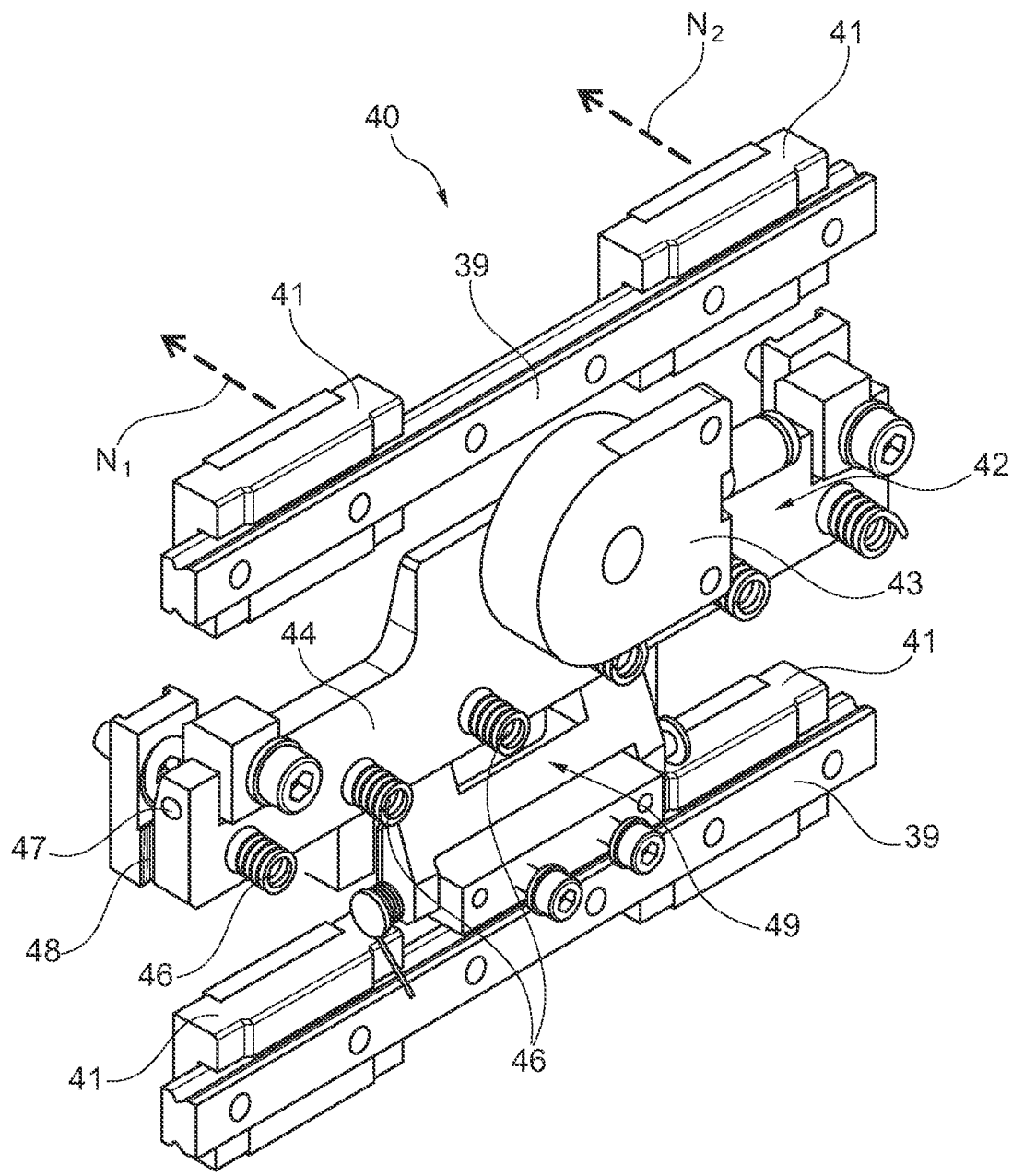
FIG. 10 is a perspective view of the lock mechanism of rows at a maximum X-pitch.

FIG. 10 shows a perspective view of a locking mechanism 40 of two rows $N_1$ and $N_2$ at a maximum X-pitch 31 or at the desired pitch 30 (X-pitch). The locking mechanism 40 is mounted to a frame element 38 (see FIG. 3) of the pick and place head 4, 5, 6, 7, which is oriented in the X-coordinate direction X. The locking mechanism 40 has a lock device 49 for rows $N_1$ and $N_2$ which operates if the rows $N_1$ and $N_2$ are at the maximum X-pitch 31. The lock device 49 is needed when the changeover forks 25 or 26 are being pushed onto shafts 45 (see FIG. 13) of the pickers/grippers 20 to unlock the pickers/grippers 20 and to enable a change of the pitch 32 (Y-pitch). The rows $N_1$ and $N_2$ are mounted on blocks 41 which enable the movement of the rows along the rails 39 in the X-coordinate direction X. At the maximum X-pitch 31 the lock device 49 moves between the blocks 41 and blocks the position of the rows $N_1$ and $N_2$ when the changeover forks 25 and/or 26 are pushed into the shafts 45 of the pickers/grippers 20 in order to unlock the pickers/grippers 20 and change the pitch 32 (Y-pitch) between the two adjacent pickers/grippers 20 along the Y-coordinate direction Y. Each row $N_1$ and $N_2$ has its own row locking mechanism 42. The row locking mechanism 42 of the locking mechanism 40 has an unlock cylinder 43, acting on a bar element 44 which is biased by a plurality of locking springs 46. In case the unlock cylinder 43 is operated the bar element 44 can pivot about a pivot point 47 and a friction material 48 is disengaged from the respective row $N_1$ and $N_2$. As a consequence, the pitch 30 (X-pitch) between the rows $N_1$ and $N_2$, on which the pickers/grippers 20 are mounted on, being continuously adjustable in the X-coordinate direction X. When the rows $N_1$ and $N_2$ are at the desired position in the X-coordinate direction X friction material 48 is engaged again with the rows $N_1$ and $N_2$ to hold them at the desired pitch 30 (X-pitch).

Figure 11A:
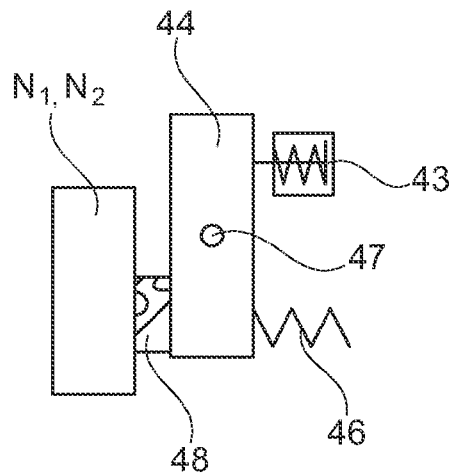
FIG. 11a is the working principle of the lock mechanism in the rows.
Figure 11B:
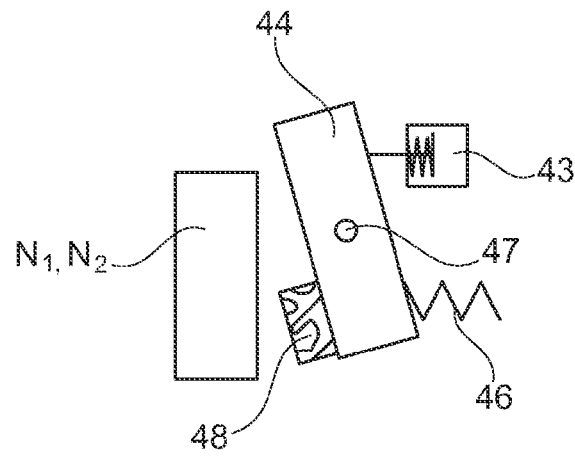
FIG. 11b is the working principle of the lock mechanism in the rows.

The locking and unlocking of the rows $N_1$ and $N_2$ is shown in simplified FIGS. 11a and 11b. With the working principle shown here the rows $N_1$ and $N_2$ can be locked or unlocked. In case the unlock cylinder 43 is not operated (see FIG. 11a) the friction material 48 is engaged with the rows $N_1$ and $N_2$ and locks them into position. In FIG. 11b the unlock cylinder 43 is operated and the bar element 44 pivots around pivot point 47. The friction material 48 is released and the rows $N_1$ and $N_2$ of pickers/grippers 20 can be moved.

Figure 12:
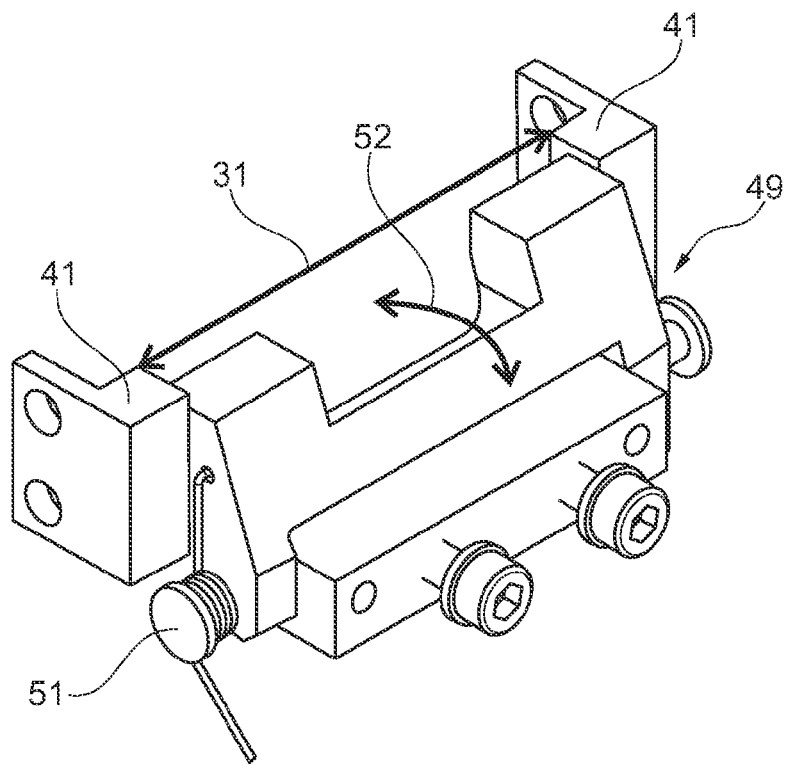
FIG. 12 is a detailed view of the device to hold the rows a maximum distance when the pitch within the rows is changed.

FIG. 12 shows a detailed view of the locking device 49 to hold the rows $N_1$ and $N_2$ at a maximum distance when the pitch 32 (Y-pitch) within the rows $N_1$ and $N_2$ is changed with the changeover forks 25, 26. The locking device 49 is between the blocks 41 for the rows $N_1$ and $N_2$ of pickers/grippers 20. The rows $N_1$ and $N_2$ are held at the maximum X-pitch 31. The locking device 49 is biased by at least one spring 51 and can carry out or support a flappable motion 52. In case the unlock cylinder 43 of the row locking mechanism 42 is operated the locking device 49 can be retracted from between the blocks 41 for the rows $N_1$ and $N_2$ of pickers/grippers 20.

Figure 13:
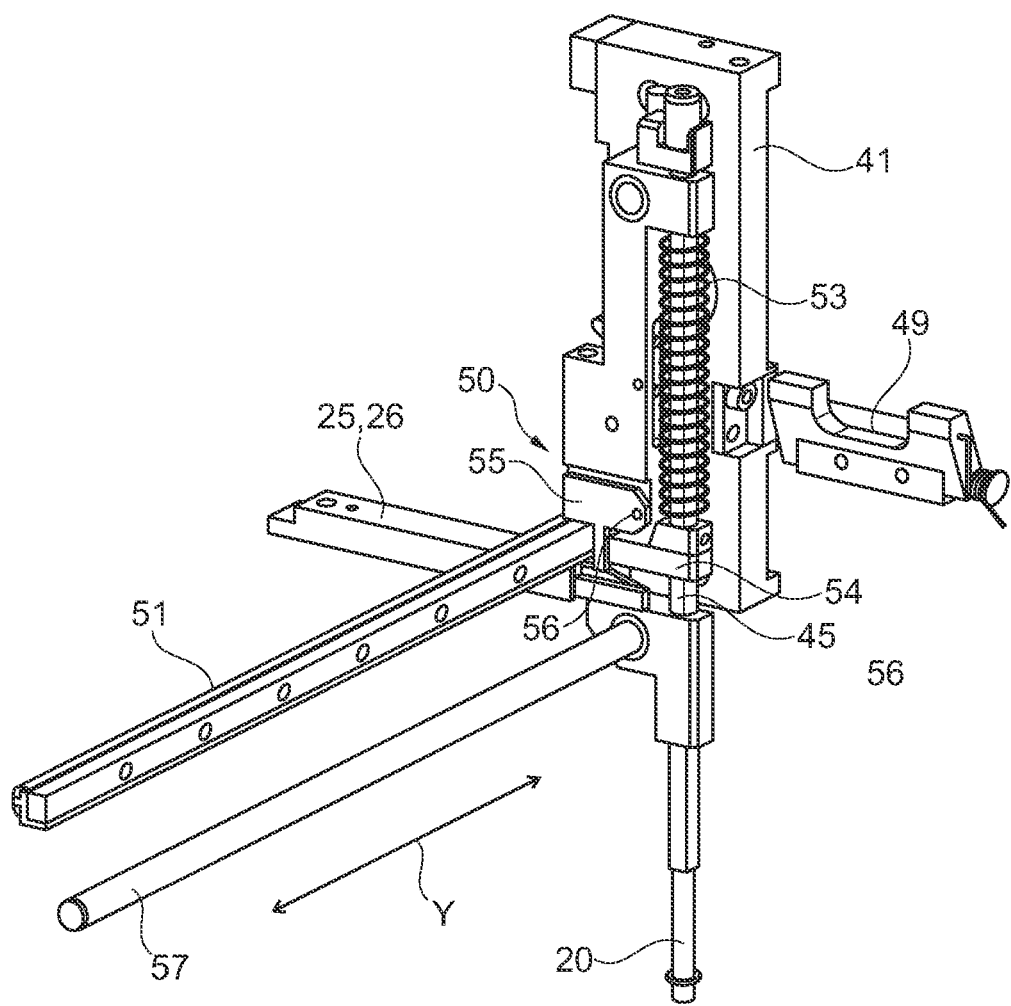
FIG. 13 is a perspective view of the changeover mechanism for changing the distance within the rows.
Figure 14:
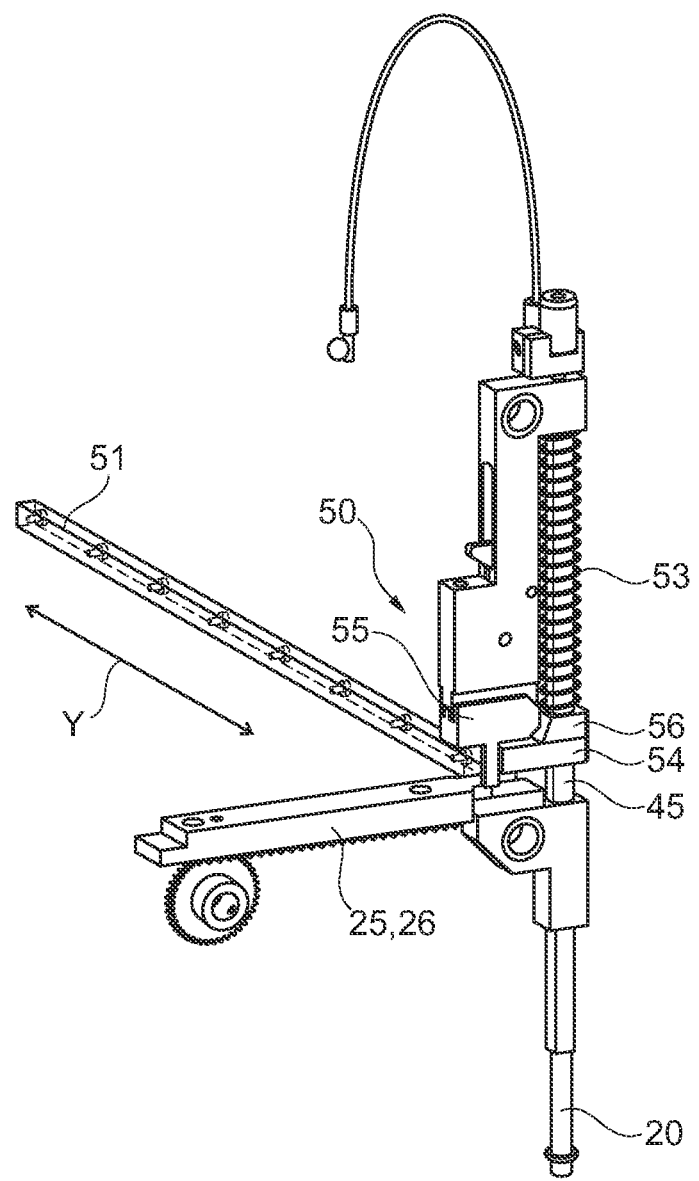
FIG. 14 is another perspective view of the changeover mechanism for changing the distance within the rows.

FIGS. 13 and 14 show a perspective view of the Y-changeover mechanism 50 for changing the distance of the pickers/grippers 20 within the rows $N_1$ and $N_2$. The pitch 32 between the pickers/grippers 20 can be changed or adjusted continuously (stepless) along the Y-coordinate direction Y. Each picker/gripper 20 has its own locking mechanism to lock the picker/gripper 20 at a ruler 51, which is orientated in the Y-coordinate direction Y. The locking mechanism comprises a locking spring 53, a friction material 54, in contact with the ruler 51 and a pivotable locking element 55. The changeover fork 25, 26 is inserted into the shaft 45 of the respective picker/gripper 20 in order to pivot the pivotable locking element 55 around a pivot point 56 and thereby releasing the friction material 54 from the ruler 51. Once the picker/gripper 20 is released from the ruler it can be moved along a guide 57 which is oriented as well along the Y-coordinate direction Y. The guide 57 is mounted in the pick and place head 4, 5, 6, 7. The stepless movement picker/gripper 20 is carried out by moving the pick and place head 4, 5, 6, 7, which is arranged between the first auto pitch station 1 and the second auto pitch station 2, along the guide 57. The changeover fork 25, 26 is attached to a picker/gripper 20 and the movement of the place head 4, 5, 6, 7 brings the picker/gripper 20 to the desired position along the Y-coordinate direction V. The pitch 32 (Y-pitch) adjustment is done by fixating the changeover fork 25, 26 to the pick and place head 4, 5, 6, 7 while moving the pick and place head 4, 5, 6, 7 using the standard transport system 12 within the pick and place device 100, in the embodiment shown in FIG. 13 the locking device 49 is in operative relationship with the blocks 41 for the rows $N_1$ and $N_2$ of pickers/grippers 20.

Figure 15:
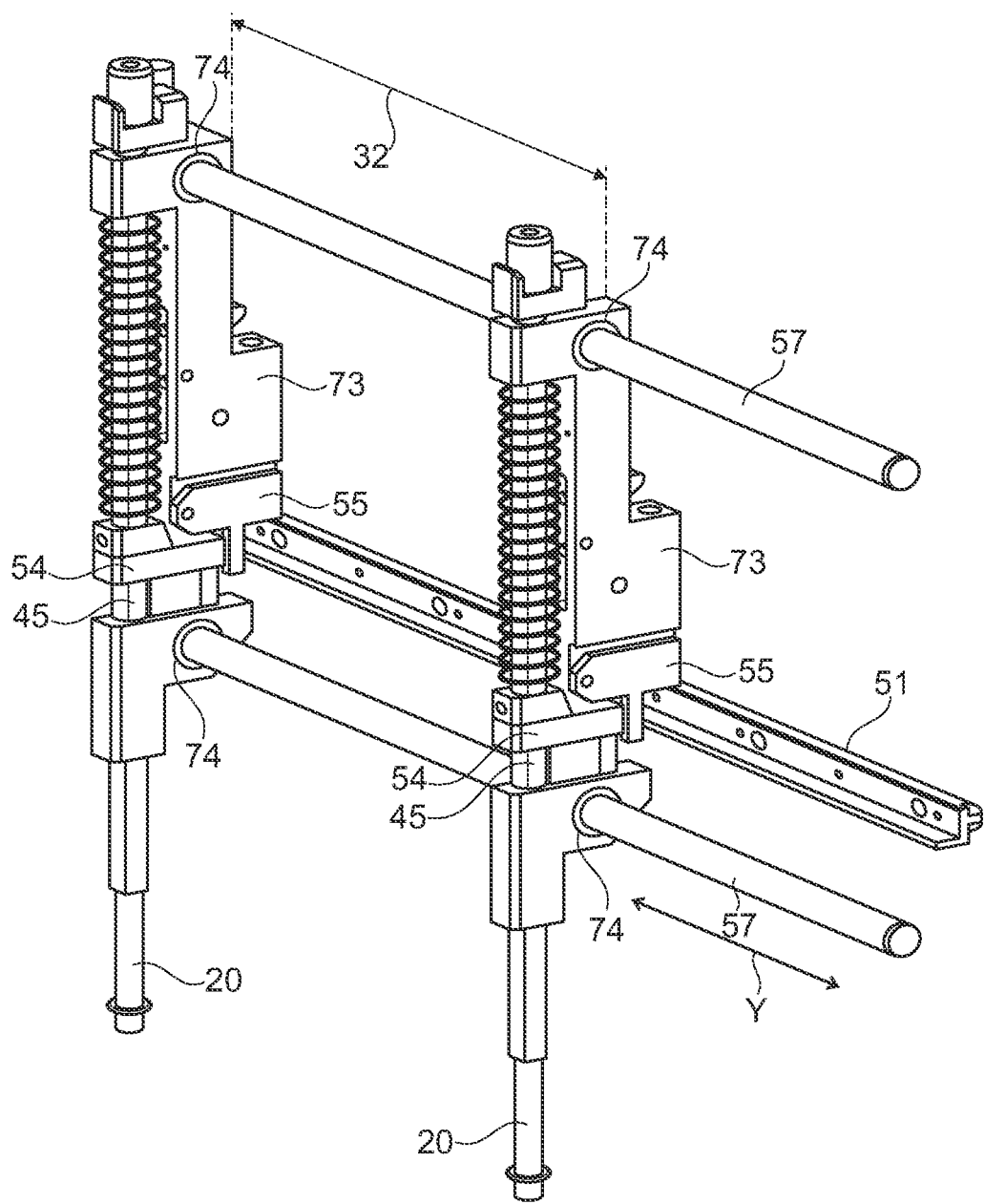
FIG. 15 is a perspective view of two pickers/grippers set at a specific distance within a row.

As shown in FIG. 15, it is preferred that the pickers/grippers 20 are moved along two guides 57. Each of the two guides 57 are mounted between two blocks 41 (see FIG. 10) in the pick and place head 4, 5, 6, 7. The two guides 57 are necessary for a stable movement of the pickers/grippers 20 in the Y-coordinate direction. The changeover fork 25, 26 is removed and the friction rubber 54 together with the pivotable locking element 55 lock the respective picker/gripper 20 at the desired position along the ruler 51. FIG. 15 shows that two consecutive pickers/grippers 20 are set at a pitch 32 (Y-pitch). Any desired pitch 32 (Y-pitch) can be set with the first auto pitch station 1 and/or the second auto pitch station 2. The shaft 45 for the picker/gripper 20 is movably mounted in a frame element 73. The frame element 73 itself has two openings 74 through which the guides 57 run in order to allow a smooth movement along the Y-coordinate direction Y.

Figure 16:
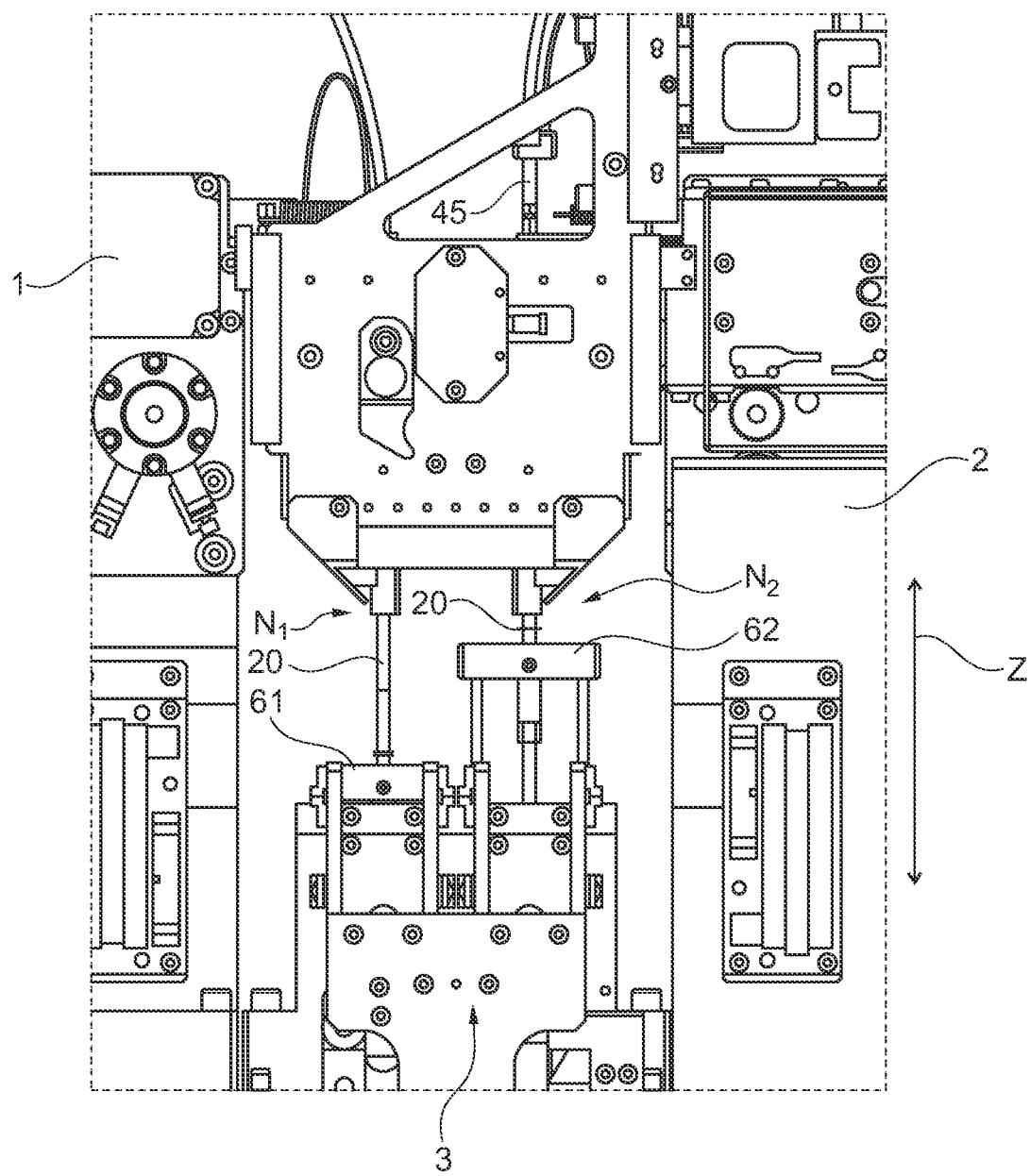
FIG. 16 is a side view of a push up mechanism for bringing the shaft of the pickers/grippers into an elevated position.

FIG. 16 shows a side view of the shaft changeover mechanism 3 to push the shaft 45 of the pickers/grippers 20 into an elevated or retracted position. The shaft changeover mechanism 3 acts on a place head 4, 5, 6, 7 which has two rows $N_1$ and $N_2$ of pickers/grippers 20. Each picker/gripper 20 can be disabled and enabled by moving it in vertical direction, along the Z-coordinate direction Z, up and down, respectively. The shaft changeover mechanism 3 is arranged between the first auto pitch station 1 and the second auto pitch station 2 (see FIG. 5). A first shaft pusher 61 and a second shaft pusher 62 are part of the shaft changeover mechanism 3. FIG. 16 shows the situation that the second shaft pusher 62 acts on a picker/gripper 20 of the second row $N_2$.

Figure 17:
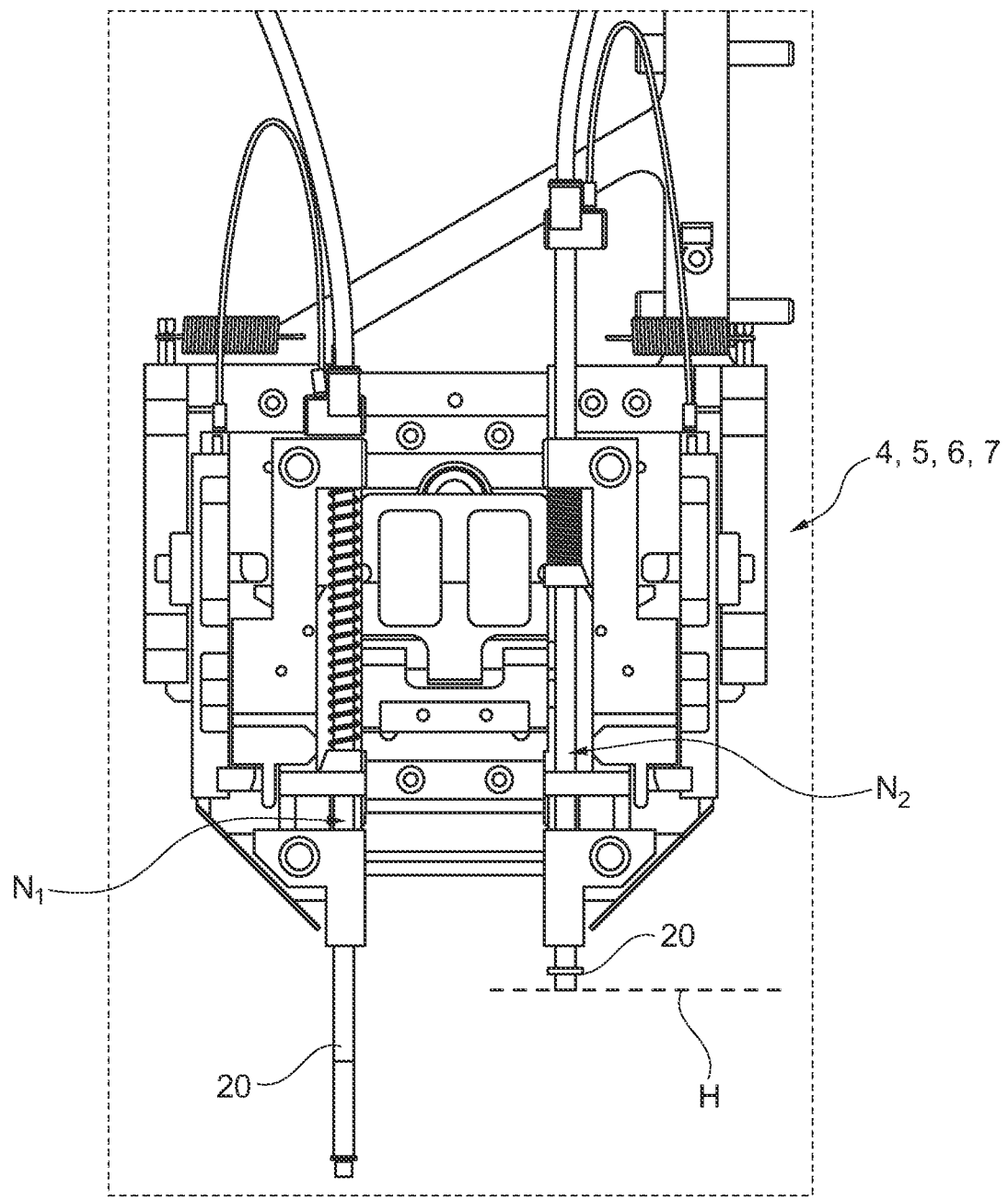
FIG. 17 is a sectional side view of the pick and place head, wherein one shaft of the pickers/grippers is at an elevated position.

FIG. 17 shows a sectional side view of the pick and place head 4, 5, 6, 7, wherein one shaft 45 of the pickers/grippers 20 in the second row $N_2$ is at an elevated position H. The picker/gripper 20 which is in the elevated position H is disabled and cannot be used to pick or place an electronic component.

Figure 18:
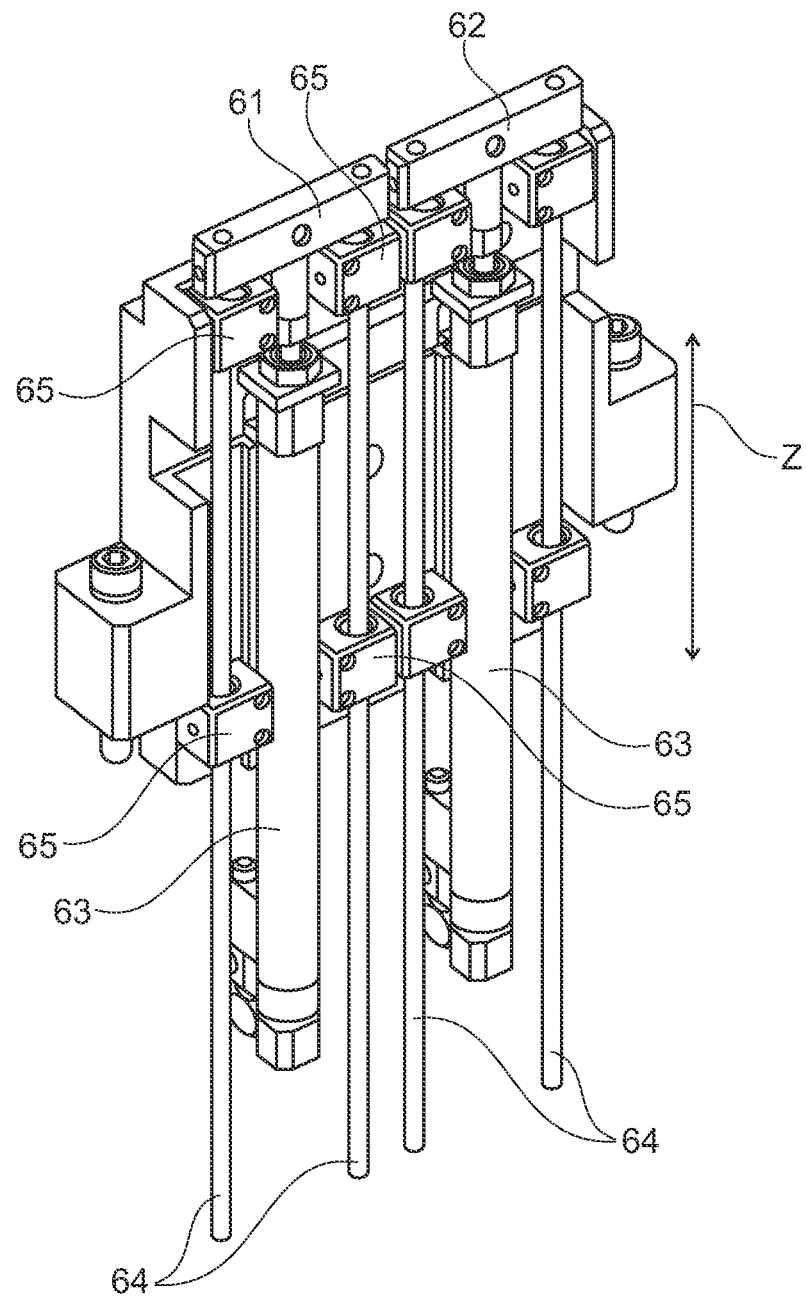
FIG. 18 is a detailed perspective view of the mechanism which push up shafts in a row.

FIG. 18 shows a detailed perspective view of the first shaft pusher 61 and the second shaft pusher 62 which are part of the shaft changeover mechanism 3 (see FIG. 16). The first shaft pusher 61 and the second shaft pusher 62 can be operated independently from one another. A hydraulic cylinder 63 is used for each of the first shaft pusher 61 and the second shaft pusher 62 in order to carry out their up and down movement. Each of the first shaft pusher 61 and the second shaft pusher 62 has two parallel rods 64, which are mounted in bearing blocks 65 for movement in the Z-coordinate direction Z.

Figures 19, 20:
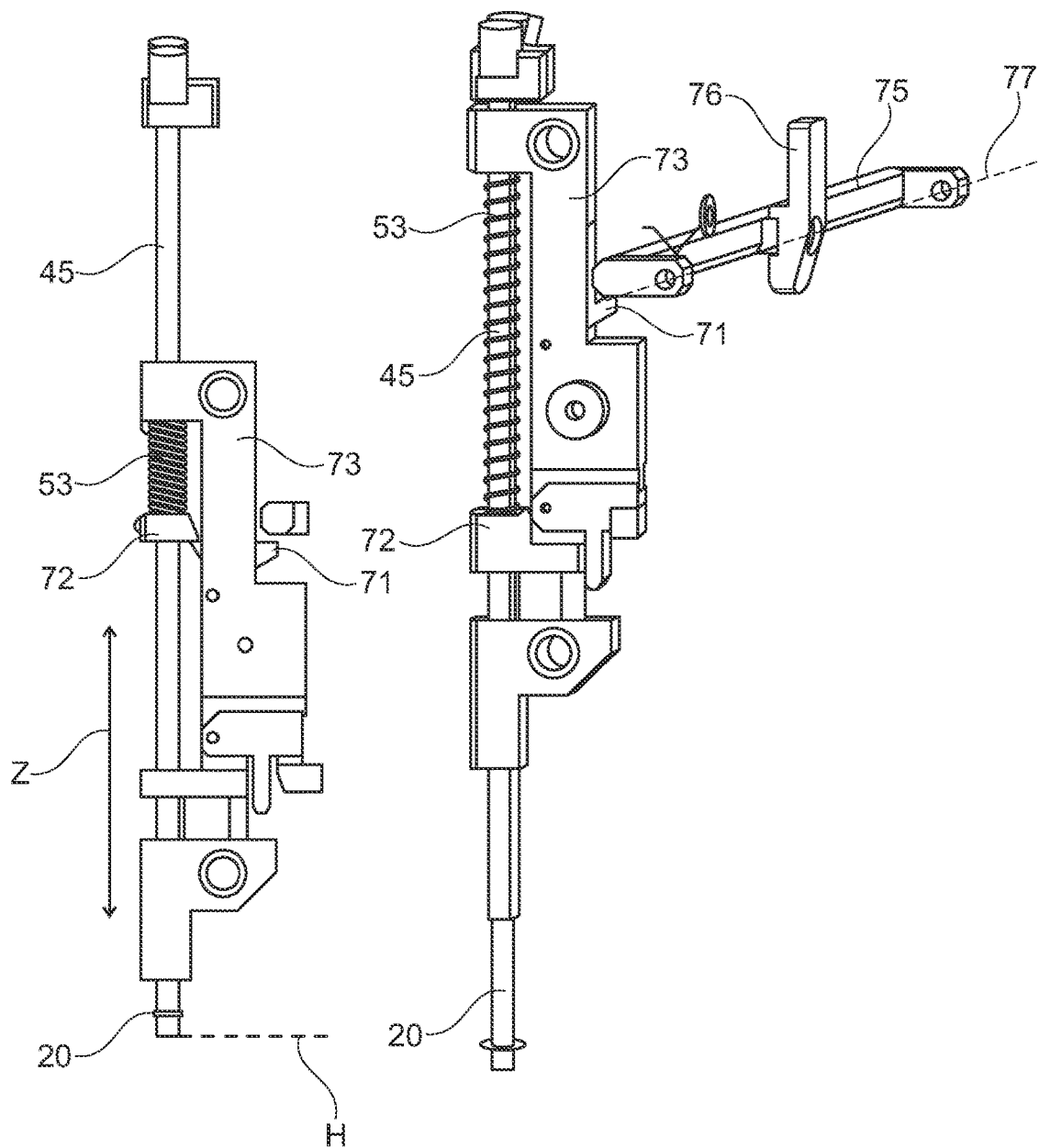
FIG. 19 shows a shaft of a picker/gripper kept by a mechanism in a pushed up and locked position.
FIG. 20 shows a shaft of a picker/gripper released by the shaft unlock mechanism so that the picker/gripper is in an operating position.

FIG. 19 shows a shaft 45 of a picker/gripper 20 kept by a shaft lock bracket 71 in a pushed up and locked position. The shaft lock bracket 71 is in engagement with a stopper 72 of the locking spring 53 and the shaft 45 is thereby held at the elevated position H. The shaft 45 is guided for movement in a frame element 73 along the Z-coordinate direction Z. The locking spring 53 is compressed.

FIG. 20 shows that the shaft 45 of a picker/gripper 20 is released by a shaft unlock mechanism 75. In case the shaft 45 is unlocked the respective picker/gripper 20 is in an operating position. According to the embodiment shown here, unlocking of the shaft 45 could be done centrally per row $N_1$, which means that all pickers/grippers 20 are unlocked at the same time. According to an alternative embodiment an independent unlocking per picker/gripper 20 is possible as well. FIG. 20 shows the central unlocking. The shaft unlock mechanism 75 has a central lever 76 which is pushed by a motorized pusher 23 of the first auto pitch station 1 or pusher 24 the second auto pitch station 2, respectively. The pusher 23 and/or pusher 24 have a dual function. As mentioned above, the pusher, movable in the X-coordinate direction is used to move individual or all disabled nozzles of a row down by activating a shaft unlock mechanism of the pickers/grippers of each row $N_1$ and $N_2$. Due to the push, the shaft unlock mechanism 75 pivots around a pivot axis 77 and comes into mechanical contact with the shaft lock bracket 71. The shaft lock bracket 71 is disengaged from the stopper 72 and the shaft 45 falls, supported by the locking spring 53, down and is again in the operative position.

Figure 21A:
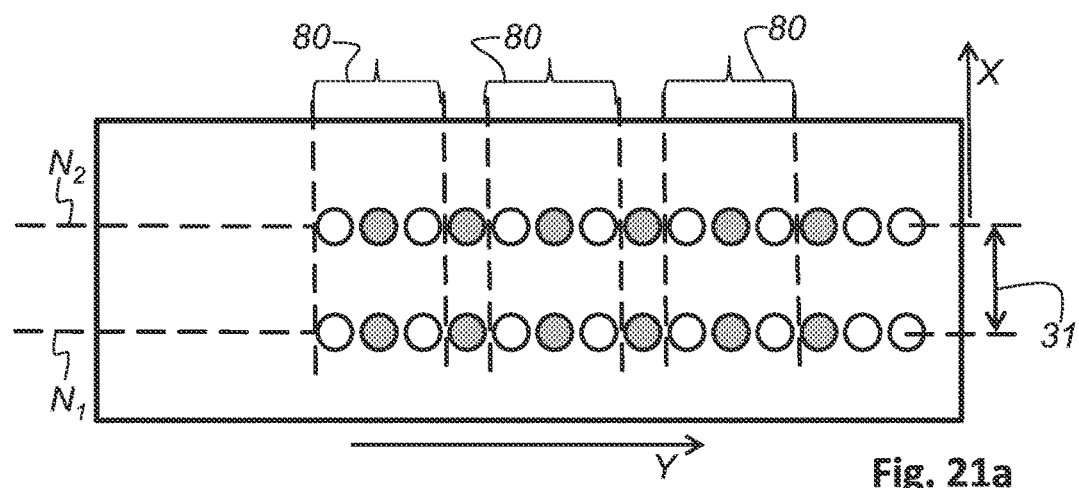
FIG. 21a shows a different pattern of the arrangement of the pickers/grippers in a pick and place head.
Figure 21B:
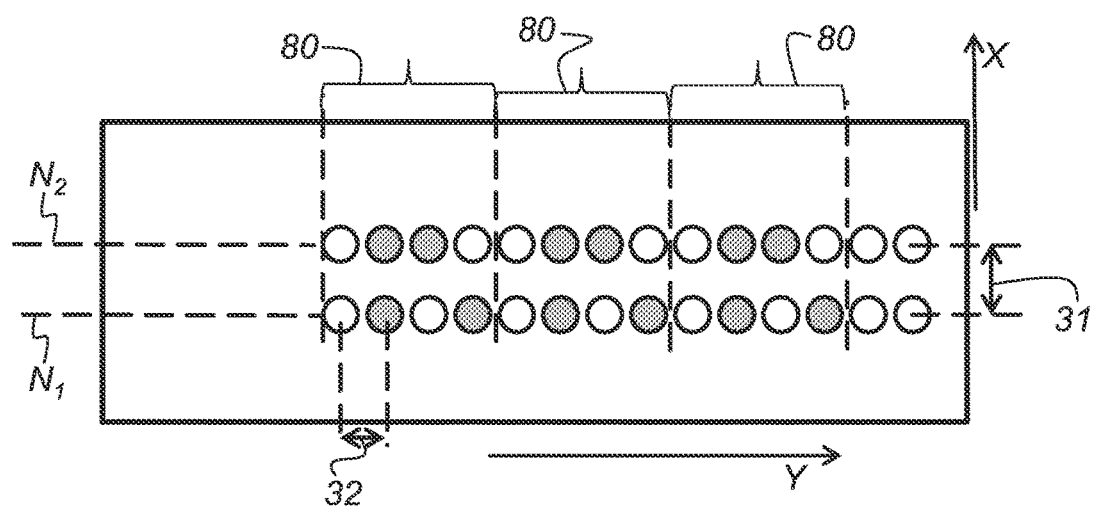
FIG. 21b shows a different pattern of the arrangement of the pickers/grippers in a pick and place head; and, FIG. 22 is a perspective view of an embodiment of the pick and place head, wherein pickers/grippers are arranged in a single row.

FIGS. 21*a* and 21*b* show two different patterns of the arrangement of the pickers/grippers 20 in a pick and place head 4, 5, 6, 7. The pick and place head shown here has two rows $N_1$ and $N_2$ of pickers/grippers 20 and each row has fourteen pickers/grippers 20 arranged at a pitch 32 (Y-pitch) in the coordinate direction Y. According to the requirement of the electronic components to be handled the pitch 30 (X-pitch) can be adjusted as well. As described in FIGS. 18 to 20 individual pickers/grippers 20 can be disabled. The respective picker/gripper 20 is brought by the shaft changeover mechanism 3 into the elevated position H. The pickers/grippers 20 which are in the elevated position H are marked as filled circles in FIGS. 21*a* and 21*b*. The present invention enables any desired pattern which is needs to handle the electronic component. In FIG. 21*a* three pickers/grippers 20 per row $N_1$ and $N_2$ form one handling unit 80 which is used to handle one electronic component. As shown in FIG. 21*a* the pickers/grippers 20 of one unit 80 have the middle picker/gripper 20 per row $N_1$ and $N_2$ and per unit 80 disabled. The units are separated by one disabled picker/gripper 20 per row $N_1$ and $N_2$. In FIG. 21*b* four pickers/grippers 20 per row $N_1$ and $N_2$ form a unit 80. The disabled pickers/grippers 20 are shown as filled circles. The pattern of unit 80 is formed in that the second and fourth picker/gripper 20 of row $N_1$ is disabled and the second and third picker/gripper 20 of row $N_2$ is disabled. Any pattern which is required for handling specific electronic components can be formed by present invention.

Figure 22:
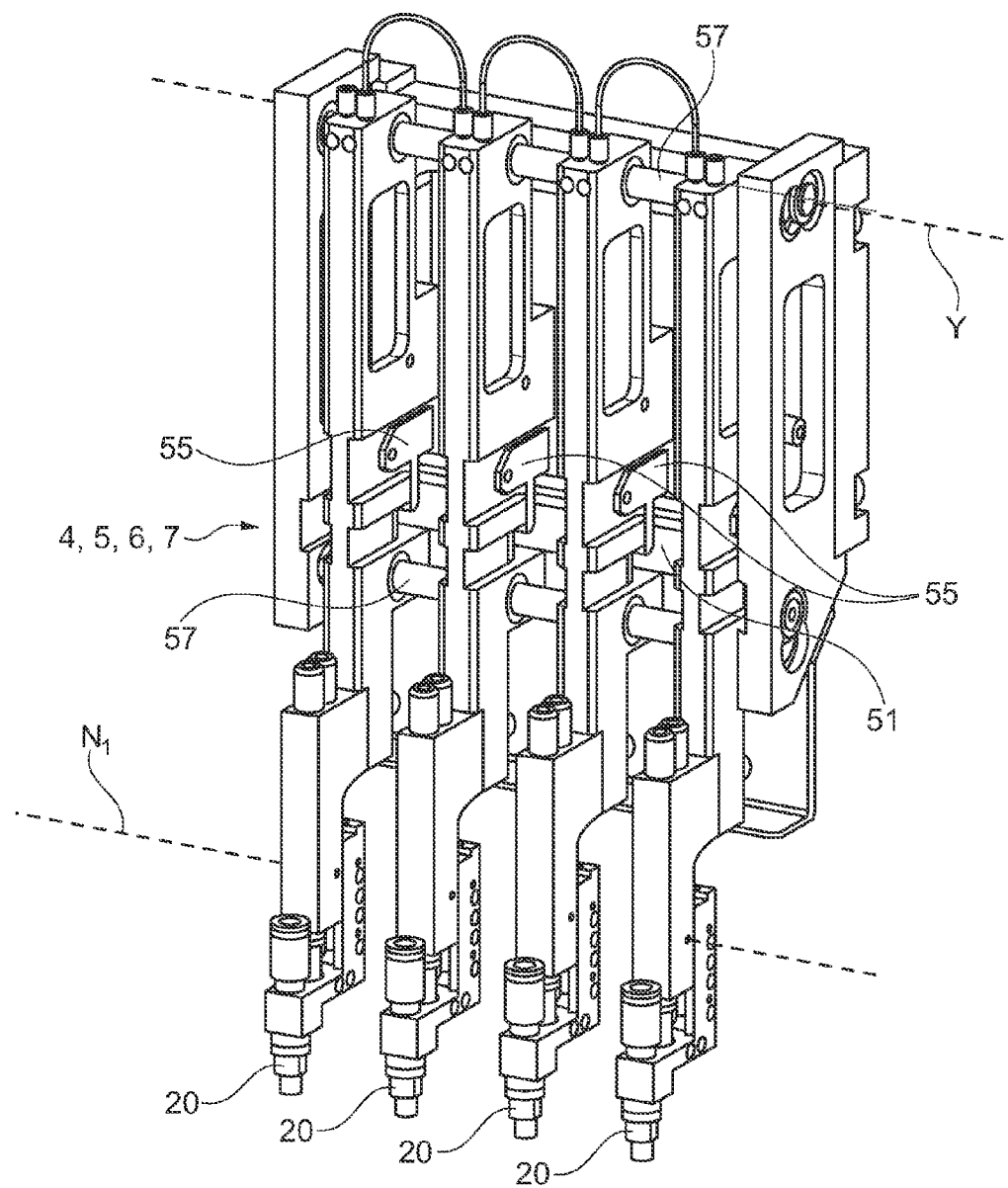

FIG. 22 shows an embodiment of a pick and place head 4, 5, 6, 7 which has four pickers/grippers 20 arranged in one row $N_1$. The pickers/grippers 20 can be moved along the guides 57 which are oriented in the Y-coordinate direction. Each picker/gripper 20 has as well a pivotable locking element 55 (described already in FIG. 15) which is used to lock a respective picker/gripper 20 at the desired position along the ruler 51.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

LIST OF REFERENCE NUMERALS

1 first auto pitch station
2 second auto pitch station
3 shaft changeover mechanism
4 pick and place head
5 pick and place head
6 pick and place head
7 pick and place head
9 sensing system
10 motor
12 transport system
13 transport lane
14 transport lane
15 transport lane
16 transport lane
20 picker/gripper
21 motor gear assembly of first auto pitch station
22 motor gear assembly of second auto pitch station
23 pusher
24 pusher
25 changeover fork
26 changeover fork
29 gear rack
30 pitch (X-pitch)
31 maximum X-pitch
32 pitch (Y-pitch)
34 height
35 gear wheel
36 elastic element
38 rigid frame
39 rail
40 locking mechanism
41 block
42 row locking mechanism
43 unlock cylinder
44 bar element 45 shaft
46 locking spring
47 pivot point
48 friction material
49 lock device
50 Y-changeover mechanism
51 ruler
52 flappable motion
53 locking spring
54 friction material
55 locking element
56 pivot point
57 guide
61 first shaft pusher
62 second shaft pusher
63 hydraulic cylinder
64 rod
65 bearing block
71 shaft lock bracket
72 stopper
73 frame element
74 openings
75 shaft unlock mechanism
76 central lever
77 pivot axis
80 handling unit
100 pick and place device
H elevated position
$N_1, N_2, N_3, N_4, \ldots, N_N$ row
$M_1, M_2, M_3, M_4, \ldots, M_N$ column
X X-coordinate direction
Y Y-coordinate direction
Z Z-coordinate direction

What is claimed is:

1. An apparatus for automatic pitch conversion for pick and place heads, comprising:
    at least one auto pitch station for adjusting a pitch in a X-coordinate direction and/or adjusting a pitch in a Y-coordinate direction of pickers/grippers of the pick and place heads;
    a first actuator, operated by a motor gear assembly of the at least one auto pitch station, wherein the first actuator comprises a first gear wheel and a first gear rack, the first actuator operatively arranged to change the pitch in the X-coordinate direction distance between rows of pickers/grippers of the respective pick and place head; and,
    a second actuator operated by the same motor gear assembly of the at least one auto pitch station, wherein the second actuator changes the pitch in the Y-coordinate direction between the pickers/grippers within a row of the respective pick and place head.

2. The apparatus as recited in claim 1, wherein the first actuator is a pusher which is moved along the X-coordinate direction.

3. The apparatus as recited in claim 1, wherein the second actuator is operatively arranged to translate a changeover fork along the X-coordinate direction in order to grab a single picker/gripper of a row or changing the pitch in the Y-coordinate direction.

4. The apparatus as recited in claim 1, wherein a third actuator is associated with the at least one auto pitch station for moving the pickers/grippers in a Z-coordinate direction in order to disable individual pickers/grippers.

5. The apparatus as recited in claim 4, wherein the third actuator is a shaft changeover mechanism with at least one shaft pusher which is movable in the Z-coordinate direction for pushing the pickers/grippers into a disabled position.

6. The apparatus as recited in claim 5, wherein the pusher is used to operate shaft unlock mechanism to bring at least one picker/gripper in an operating position.

7. The apparatus as recited in claim 1, wherein a first auto pitch station and a second auto pitch station are arranged opposite to each other and a shaft changeover mechanism is arranged between the first auto pitch station and the second auto pitch station.

8. The apparatus for automatic pitch conversion for pick and place heads of claim 1, wherein the second actuator comprises a second gear wheel and a second gear rack.

9. An apparatus for automatic pitch conversion for pick and place heads, comprising:
    a first auto pitch station and a second auto pitch station for adjusting a pitch in a X-coordinate direction and/or adjusting a pitch in a Y-coordinate direction of pickers/grippers of at least one pick and place head;
    a first actuator operated by a motor gear assembly of the first auto pitch station, wherein the first actuator comprises a first gear wheel and a first gear rack, the first actuator operatively arranged to change the pitch in the X-coordinate direction between rows of pickers/grippers of the respective pick and place head; and,
    a first actuator operated by a motor gear assembly of the second auto pitch station, wherein the first actuator comprises a first gear wheel and a first gear rack, the first actuator operatively arranged to change the pitch in the X-coordinate direction distance between rows of pickers/grippers of the respective pick and place head;
    a second actuator operated by the same motor gear assembly of the first auto pitch station, wherein the second actuator changes the pitch in the Y-coordinate direction between the pickers/grippers within a row of the respective pick and place head and a second actuator operated by the same motor gear assembly of the second auto pitch station, wherein the second actuator changes the pitch in the Y-coordinate direction between the pickers/grippers within a row; and,
    a third actuator is arranged between the first auto pitch station and the second auto pitch station for moving the pickers/grippers in a Z-coordinate direction in order to disable individual pickers/grippers.

10. The apparatus as recited in claim 9, wherein the first actuator is a pusher, wherein the pusher of the first auto pitch station is moved by the motor gear assembly of the first auto pitch station and the pusher of the second auto pitch station is moved by the motor gear assembly of the second auto pitch station along the X-coordinate direction in opposing directions.

11. The apparatus as recited in claim 9, wherein the second actuator is operatively arranged to translate a changeover fork, wherein the changeover fork of the first auto pitch station is moved by the motor gear assembly of the first auto pitch station and the changeover fork of the second auto pitch station is moved by the motor gear assembly of the second auto pitch station along the Y-coordinate direction in opposing directions in order to grab a single picker/gripper of a row of the rows of picker/grippers or changing the pitch in the X-coordinate direction.

12. The apparatus as recited in claim 9, wherein the third actuator is a shaft changeover mechanism with at least one shaft pusher which is movable in the Z-coordinate direction, for pushing selected pickers/grippers into a disabled position.

* * * * *